(12) United States Patent
Martin et al.

(10) Patent No.: US 8,636,490 B1
(45) Date of Patent: Jan. 28, 2014

(54) SYSTEMS AND METHODS FOR FORMING NON-PNEUMATIC TIRES

(75) Inventors: Kevin L. Martin, Washburn, IL (US);
Aaron K. Amstutz, Peoria, IL (US);
David J. Colantoni, Metamora, IL (US);
Stephen J. Pierz, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/606,945

(22) Filed: Sep. 7, 2012

(51) Int. Cl.
*B29C 33/42* (2006.01)
*B29D 30/02* (2006.01)

(52) U.S. Cl.
USPC .............................. 425/37; 425/47; 425/170

(58) Field of Classification Search
USPC ................................. 425/37, 47, 170; 152/326
See application file for complete search history.

(56) References Cited

U.S. PATENT DOCUMENTS

| | | | |
|---|---|---|---|
| 854,699 A | 5/1907 | Nash | |
| 1,125,191 A | 1/1915 | Scotucci et al. | |
| 1,164,887 A | 12/1915 | Strauch et al. | |
| 1,386,512 A * | 8/1921 | Lambert | 425/37 |
| 1,386,513 A * | 8/1921 | Lambert | 425/37 |
| 1,399,128 A * | 12/1921 | Lambert | 425/37 |
| 1,509,259 A * | 9/1924 | Rett et al. | 425/37 |
| 1,572,440 A * | 2/1926 | Lambert | 425/37 |
| 1,587,577 A * | 6/1926 | Beitel | 425/37 |
| 1,604,034 A * | 10/1926 | Gillam et al. | 425/37 |
| 1,604,450 A * | 10/1926 | Krusemark | 425/37 |
| 2,620,844 A | 12/1952 | Lord | |
| 4,553,577 A | 11/1985 | Gregg | |
| 4,934,425 A | 6/1990 | Gajewski et al. | |
| 4,945,962 A | 8/1990 | Pajtas | |
| 5,042,544 A | 8/1991 | Dehasse | |
| 7,329,325 B2 * | 2/2008 | Prost | 264/326 |
| 8,091,596 B2 | 1/2012 | Louden | |
| 8,109,308 B2 | 2/2012 | Manesh et al. | |
| 2011/0079335 A1 | 4/2011 | Manesh et al. | |

* cited by examiner

*Primary Examiner* — James Mackey
(74) *Attorney, Agent, or Firm* — Finnegan, Henderson, Farabow, Garrett & Dunner LLP

(57) ABSTRACT

A system for molding a non-pneumatic tire includes a lower mold portion including a lower face plate configured to provide a lower relief corresponding to a first side of the tire. The lower mold portion also includes a plurality of lower projections extending from the lower face plate and configured to correspond to cavities in the first side of the tire, wherein the lower projections taper as the lower projections extend from the lower face plate, and wherein at least some of the lower projections are hollow. The system further includes an upper mold portion configured to be coupled to the lower mold portion. The lower mold portion and the upper mold portion are configured to be coupled to one another, such that a hub associated with the tire provides a seal between the lower mold portion and the upper mold portion.

18 Claims, 17 Drawing Sheets

SYSTEMS AND METHODS FOR FORMING NON-PNEUMATIC TIRES

TECHNICAL FIELD

The present disclosure relates to systems and methods for forming non-pneumatic tires, and more particularly, to systems and methods for forming non-pneumatic tires for machines.

BACKGROUND

Machines such as vehicles, either self-propelled or pushed or pulled, often include wheels for facilitating travel across terrain. Such wheels often include a tire to protect a rim or hub of the wheel, provide cushioning for improved comfort or protection of passengers or cargo, and provide enhanced traction via a tread of the tire. Pneumatic tires are an example of such tires. Pneumatic tires include an enclosed cavity for retaining pressurized air, with the enclosed cavity being formed by either a separate annular tube or by a sealed coupling between the tire and a rim of the hub. By virtue of the pressurized air, the tire provides cushioning and shock absorption as the wheel rolls across terrain.

Pneumatic tires, however, may suffer from a number of possible drawbacks. For example, pneumatic tires may deflate due to punctures or air leaks, rendering them unsuitable for use until they are repaired or replaced. In addition, pneumatic tires may be relatively complex due to separate tubes or complex configurations for providing a sealed coupling between the tire and the rim.

In addition to these drawbacks, pneumatic tires may suffer from a number of economic drawbacks. For example, due to the relatively complex nature of pneumatic tires, manufacturing facilities for pneumatic tires may be prohibitively costly, requiring a large capital investment. Moreover, pneumatic tires formed from natural rubber may be susceptible to dramatic variability in production costs due to inconsistent availability of natural rubber.

Non-pneumatic tires, such as solid tires or tires not retaining pressurized air, may provide an alternative to pneumatic tires. Non-pneumatic tires may be relatively less complex than pneumatic tires because they do not retain air under pressure. However, non-pneumatic tires may suffer from a number of possible drawbacks. For example, non-pneumatic tires may be relatively heavy, and may not have a sufficient ability to provide a desired level of cushioning. For example, some non-pneumatic tires may provide little, if any, cushioning, potentially resulting in discomfort to passengers and/or damage to cargo and/or the machine on which the tires are installed. In addition, some non-pneumatic tires may not be able to maintain a desired level of cushioning when the load changes on the tire. In particular, if the structure of the non-pneumatic tire provides the desired level of cushioning for a given load, it may not be able to continue to provide the desired level of cushioning if the load is changed. For example, if the load is increased, the structure of the non-pneumatic tire may collapse, resulting in a loss of the desired level of cushioning or potentially damaging the tire. If the load is decreased, the level of cushioning may also decrease, resulting in an undesirable reduction in comfort and/or protection. In addition, conventional non-pneumatic tires that provide adequate cushioning may not be able to maintain the desired machine height when loaded, due to collapse of the tire under load.

An example of a cushioned tire that is not inflated is disclosed in U.S. Pat. No. 2,620,844 to Lord ("the '844 patent").

In particular, the '844 patent discloses a cushioned tire formed from a resilient material such as rubber. The tire includes a rigid inner rim shaped to be mounted on a wheel, an outer continuous tread section formed of resilient material such as rubber, and a cushion formed of resilient material extending between and connected to or united with the rim and tread section. The cushion of the tire is provided by openings that extend from one side to the other of the tire and are formed by walls which extend around the tire, with the walls being formed to transmit loads that act radially between the rim and tread.

Although the cushioned tire disclosed in the '844 patent provides an alternative to pneumatic tires, it may suffer from a number of drawbacks associated with non-pneumatic tires. For example, the tire disclosed in the '844 patent may not be able to maintain a desired level of cushioning when the load on the tire changes.

In addition, some non-pneumatic tires may be unusually large, rendering it difficult to form the tire via molding. For example, some very large machines may require unusually large tires, and forming such a large tire may present technical difficulties due to the volume of material required to form the tire. For example, forming a non-pneumatic tire by molding the tire may be difficult due to problems associated with obtaining relatively uniform temperature, heating rates, and/or cooling rates throughout such a large volume of material. In addition, it may be difficult to form a tire via molding where the molded tire has a complex structure.

The systems and methods for forming non-pneumatic tires disclosed may be directed to mitigating or overcoming one or more of the possible technical difficulties set forth above.

SUMMARY

In one aspect, the present disclosure is directed to a system for molding a non-pneumatic tire. The system includes a lower mold portion including a lower face plate configured to provide a lower relief corresponding to a first side of the tire, and a lower circular barrier coupled to the lower face plate and configured to correspond to a first portion of an outer circumferential surface of the tire. The lower mold portion also includes a plurality of lower projections extending from the lower face plate and configured to correspond to cavities in the first side of the tire, wherein the lower projections taper as the lower projections extend from the lower face plate, and wherein at least some of the lower projections are hollow. The system further includes an upper mold portion configured to be coupled to the lower mold portion. The upper mold portion includes an upper face plate configured to provide an upper relief corresponding to a second side of the tire, and an upper circular barrier coupled to the upper face plate and configured to correspond to a second portion of an outer circumferential surface of the tire. The upper mold portion also includes a plurality of upper projections extending from the upper face plate and configured to correspond to cavities in the second side of the tire, wherein the upper projections taper as the upper projections extend from the upper face plate, and wherein at least some of the upper projections are hollow. The lower mold portion and the upper mold portion are configured to be coupled to one another, such that a hub associated with the tire provides a seal between the lower mold portion and the upper mold portion.

According to a further aspect, a system for molding a non-pneumatic tire includes a lower mold portion including a lower face plate configured to provide a lower relief corresponding to a first side of the tire, and a lower circular barrier coupled to the lower face plate and configured to correspond to a first portion of an outer circumferential surface of the tire. The lower mold portion further includes a plurality of lower projections extending from the lower face plate and configured to correspond to cavities in the first side of the tire. The system also includes an upper mold portion configured to be coupled to the lower mold portion. The upper mold portion includes an upper face plate configured to provide an upper relief corresponding to a second side of the tire, and an upper circular barrier coupled to the upper face plate and configured to correspond to a second portion of an outer circumferential surface of the tire. The upper mold portion further includes a plurality of upper projections extending from the upper face plate and configured to correspond to cavities in the second side of the tire. The lower mold portion and the upper mold portion are configured to be coupled to one another, such that a hub associated with the tire provides a seal between the lower mold portion and the upper mold portion.

According to still another aspect, a system for molding a non-pneumatic tire includes a lower mold portion including a lower face plate configured to provide a lower relief corresponding to a first side of the tire, and a lower circular barrier coupled to the lower face plate and configured to correspond to a first portion of an outer circumferential surface of the tire. The lower mold portion also includes a plurality of lower projections extending from the lower face plate and configured to correspond to cavities in the first side of the tire. The system further includes an upper mold portion configured to be coupled to the lower mold portion. The upper mold portion includes an upper face plate configured to provide an upper relief corresponding to a second side of the tire, and an upper circular barrier coupled to the upper face plate and configured to correspond to a second portion of an outer circumferential surface of the tire. The upper mold portion also includes a plurality of upper projections extending from the upper face plate and configured to correspond to cavities in the second side of the tire. The system also includes at least one temperature sensor associated with the lower and upper mold portions. The at least one temperature sensor is configured to provide signals indicative of the temperature of material received in the lower and upper mold portions during at least one of forming the tire and use of the formed tire.

According to a further aspect, the present disclosure is directed to a system for separating a molded non-pneumatic tire from a tire mold, wherein the tire mold includes a lower mold portion and an upper mold portion configured to be associated with the lower mold portion, such that a hub associated with the non-pneumatic tire is confined between the lower and upper mold portions. The system includes a plurality of actuators associated with at least one of an inner diameter and an outer periphery of at least one of the lower mold portion and the upper mold portion, such that the plurality of actuators are spaced circumferentially about the tire mold. The system further includes a manifold providing flow communication with each of the plurality of actuators, and an operator interface associated with the manifold. The operator interface is configured to facilitate activation of all of the plurality of actuators simultaneously and independently from one another.

According to a further aspect, a system for molding a non-pneumatic tire includes a lower mold portion including a lower face plate configured to provide a lower relief corresponding to a first side of the tire, with the lower face plate having an inner diameter and an outer periphery. The lower mold portion also includes a lower circular barrier coupled to the lower face plate and configured to correspond to a first portion of an outer circumferential surface of the tire. The lower mold portion also includes a plurality of lower projections extending from the lower face plate and configured to correspond to cavities in the first side of the tire. The system also includes an upper mold portion configured to be coupled to the lower mold portion. The upper mold portion includes an upper face plate configured to provide an upper relief corresponding to a second side of the tire, with the upper face plate having an inner diameter and an outer periphery. The upper mold portion also includes an upper circular barrier coupled to the upper face plate and configured to correspond to a second portion of an outer circumferential surface of the tire. The upper mold portion further includes a plurality of upper projections extending from the upper face plate and configured to correspond to cavities in the second side of the tire. The system also includes a separation system configured to separate the upper mold portion from the lower mold portion after a molding material has been supplied to the lower and upper mold portions. The separation system includes a plurality of circumferentially spaced actuators associated with at least one of the inner diameter and the outer periphery of at least one of the lower mold portion and the upper mold portion, wherein the plurality of actuators is configured to be actuated simultaneously and independently from one another.

According to still another aspect, the present disclosure is directed to a method for separating a molded non-pneumatic tire from a tire mold, with the tire mold including a lower mold portion having an inner diameter and an outer periphery, and an upper mold portion having an inner diameter and an outer periphery. The method includes providing a plurality of actuators at at least one of the inner diameter and outer periphery of at least one of the lower mold portion and the upper mold portion, and independently activating a first portion of the plurality of actuators, such that the upper mold portion is separated from the lower mold portion. The method further includes independently activating a second portion of the plurality of actuators, such that the tire is separated from the lower mold portion.

According to another aspect, a reservoir for catching a portion of overflow of molding material from a non-pneumatic tire mold during molding includes a tubular portion having a proximal end and a distal end, and a flange associated with the proximal end of the tubular portion. The flange is configured to be associated with a surface of the tire mold, such that the tubular portion extends substantially perpendicular to the surface of the tire mold. The reservoir further includes a reservoir portion configured to be removably mounted around the tubular portion. The reservoir portion includes a base having an aperture configured to receive the tubular portion, and a wall configured such that molding material flowing from the distal end of the tubular portion is received in the reservoir portion.

According to yet another aspect, a system for molding a non-pneumatic tire includes a tire mold including a lower mold portion configured to provide a lower relief corresponding a first side of the tire, and an upper mold portion configured to be coupled to the lower mold portion. The upper mold portion is configured to provide an upper relief corresponding a second side of the tire. The system further includes a reservoir for catching a portion of overflow of molding material from the tire mold during molding. The reservoir includes a tubular portion having a proximal end and a distal end. The reservoir further includes a flange associated with the proximal end of the tubular portion, with the flange being configured to be associated with the upper mold portion of the tire mold, such that the tubular portion extends substantially perpendicular to the upper mold portion. The reservoir further includes a reservoir portion configured to be removably mounted around the tubular portion. The reservoir portion includes a base having an aperture configured to receive the tubular portion, and a wall configured such that molding material flowing from the distal end of the tubular portion is received in the reservoir portion.

According to a further aspect, the present disclosure is directed to a method of molding a non-pneumatic tire in a tire mold. The tire mold includes an upper mold portion having a plurality of apertures for receiving molding material. The method includes providing molding material to an interior of the tire mold via one or more of the plurality of apertures to substantially fill the tire mold, and catching an overflow of molding material in a reservoir coupled to the upper mold portion of the tire mold at at least one of the apertures. The method further includes waiting for the molding material in the interior of the tire mold to at least partially cure, and removing the overflow from the tire mold by lifting a portion of the reservoir from the upper mold portion of the tire mold.

According to yet a further aspect, a method for molding a non-pneumatic tire includes placing a hub configured to be associated with the tire into a lower mold portion, such that a first portion of the hub provides a seal with the lower mold portion. The method further includes associating at least one temperature sensor with the lower mold portion, and placing an upper mold portion onto the lower mold portion and the hub to create a mold assembly having an interior, such that a second portion of the hub provides a seal with the upper mold portion. The method further includes heating the mold assembly, heating a molding material, and transferring the heated molding material into the interior of the mold assembly, such that the interior is substantially filled. The method further includes heating the mold assembly and molding material until the at least one temperature sensor indicates that the molding material has reached a first temperature, and maintaining the temperature of the molding material at the first temperature for a first predetermined period of time. The method further includes reducing the temperature of the molding material to a second temperature after the first predetermined period of time, and maintaining the molding material at the second temperature for a second predetermined period of time. The method further includes separating the upper mold portion from the lower mold portion, and separating the tire from the lower mold portion.

According to another aspect, a method for molding a non-pneumatic tire includes placing a hub configured to be associated with the tire into a lower mold portion, such that a first portion of the hub provides a seal with the lower mold portion. The lower mold portion includes a plurality of first projections configured to create cavities in the tire. The method further includes placing spacers on ends of at least some of the first projections, and placing an upper mold portion onto the lower mold portion and the hub to create a mold assembly having an interior, such that a second portion of the hub provides a seal with the upper mold portion. The upper mold portion includes a plurality of second projections configured to create cavities in the tire. The spacers are located between ends of the at least some first projections and respective ends of at least some of the second projections. The method further includes heating the mold assembly, heating a molding material, and transferring the heated molding material into the interior of the mold assembly, such that the interior is substantially filled. The method further includes heating the mold assembly and molding material, and separating the upper mold portion from the lower mold portion. The method further includes separating the tire from the lower mold portion, wherein the tire includes a plurality of cavities that extend from one side of the tire to another side of the tire in an uninterrupted manner.

According to still another aspect, a method for molding a non-pneumatic tire includes placing a hub configured to be associated with the tire into a lower mold portion, such that a first portion of the hub provides a seal with the lower mold portion. The method further includes locating the lower mold portion and the hub under a lift apparatus configured to lift and lower an upper mold portion. The method further includes lowering an upper mold portion onto the lower mold portion and the hub via the lift apparatus to create a mold assembly having an interior, such that a second portion of the hub provides a seal with the upper mold portion. The method further includes moving the mold assembly into an oven, heating the mold assembly, and removing the mold assembly from the oven. The method further includes heating a molding material, and transferring the heated molding material into the interior of the mold assembly, such that the interior is substantially filled. The method further includes moving the filled mold assembly into the oven, heating the filled mold assembly in the oven, and removing the filled mold assembly from the oven. The method further includes locating the filled mold assembly under the lift apparatus, lifting the upper mold portion from the lower mold portion, and separating the tire from the lower mold portion.

DETAILED DESCRIPTION

Figure 1:
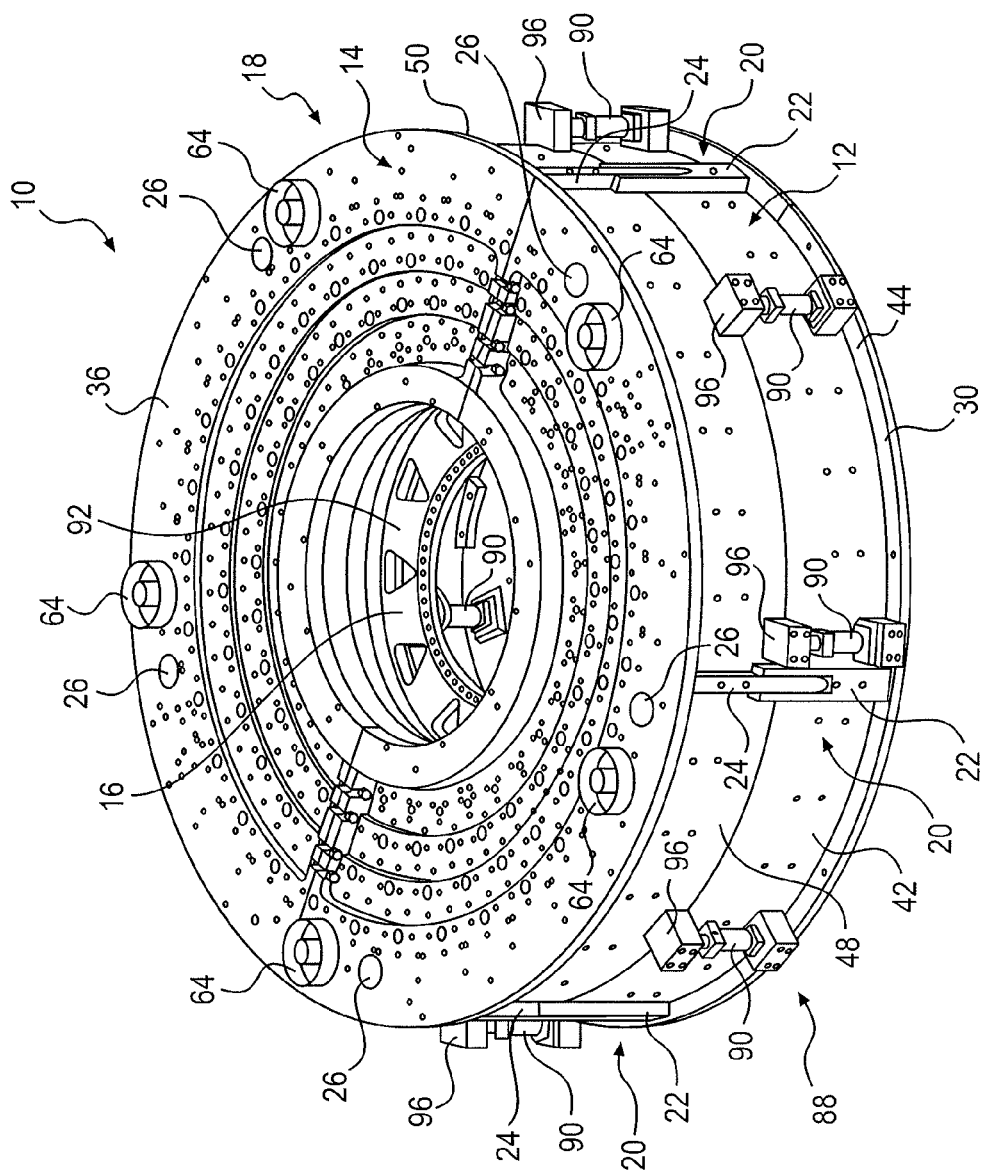
FIG. 1 is a perspective view of an exemplary embodiment of a system for molding a non-pneumatic tire.

FIG. 1 shows an exemplary embodiment of a system 10 for molding non-pneumatic tires. In the exemplary embodiment shown, system 10 includes a lower mold portion 12 and an upper mold portion 14 mounted on lower mold portion 12, such that a hub 16 associated with the molded tire is received between lower mold portion 12 and upper mold portion 14. In this exemplary embodiment, the combination of lower mold portion 12, upper old portion 14, and hub 16 form a mold assembly 18 defining a sealed interior configured to receive a molding material. According to some embodiments, upon receipt of the molding material, hub 16 is molded into the molded tire.

Mold assembly 18 shown in FIG. 1 includes a plurality of circumferentially spaced guide assemblies 20 configured to facilitate alignment of lower mold portion 12 and upper mold portion 14. For example, lower mold portion 12 includes a plurality of circumferentially spaced guide receivers 22, and upper mold portion 14 includes a plurality of circumferentially spaced guide pins 24 configured to be received by guide receivers 22, such that lower mold portion 12 and upper mold portion 14 are aligned.

Exemplary mold assembly 18 also includes a plurality of circumferentially spaced apertures 26 configured to provide a flow path for molding material to be supplied or transferred to the interior of mold assembly 18. As a result of having a number of apertures 26 for facilitating filling of mold assembly 18, molding material can be simultaneously supplied through a number of apertures 26 (e.g., all of apertures 26) to the interior of mold assembly 18, thereby increasing the rate at which the molding material may be supplied. This may be particularly desirable if, for example, the size of the tire being molded is particularly large and requires a large volume of molding material. Increasing the rate at which the molding material is added to mold assembly 18 may result in maintaining a relatively uniform temperature of the molding material at various locations in the interior of mold assembly 18. System 10 may also include caps 28 (see FIGS. 7-9) configured to seal apertures 26 after mold assembly 18 has been substantially filled with the molding material. Caps 28 may be secured to upper mold portion 14 via, for example, threaded fasteners such as bolts.

Figure 2:
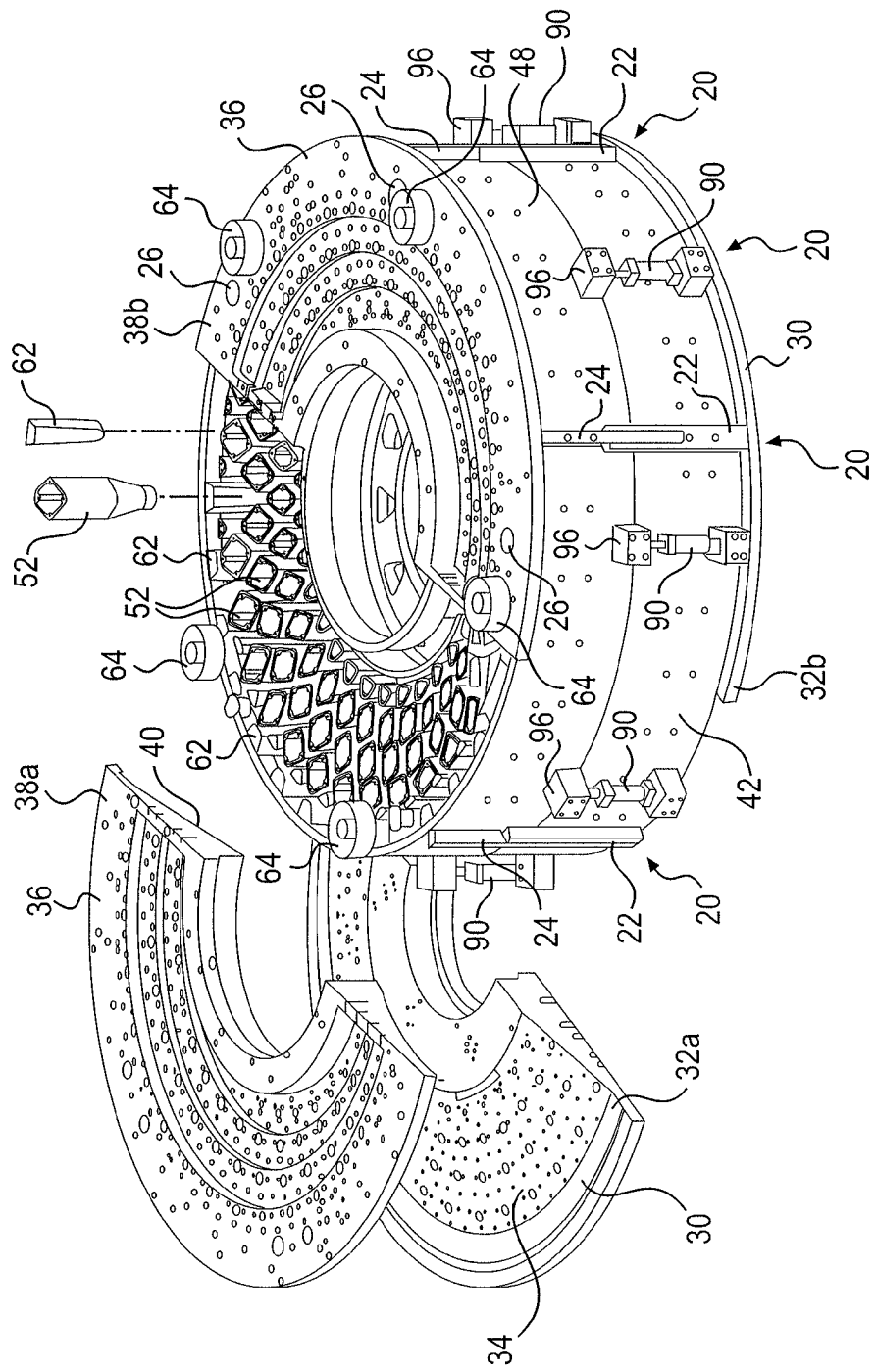
FIG. 2 is a partially exploded view of the exemplary embodiment shown in FIG. 1.

As shown in FIG. 2, exemplary lower mold portion 12 includes a lower face plate 30. According to some embodiments, lower face plate 30 may include two semi-circular sections 32a and 32b coupled to one another via pins and/or bolts. Lower face plate 30 may be configured to provide a lower relief 34 corresponding to a side of the tire being molded. Similarly, exemplary upper mold portion 14 includes an upper face plate 36. According to some embodiments, upper face plate 36 may include two semi-circular sections 38a and 38b coupled to one another via pins and/or bolts. Upper face plate 36 may be configured to provide an upper relief 40 corresponding to a side of the tire being molded opposite from the side formed by lower relief 34 of lower face plate 30. Lower face plate 30 and/or upper face plate 36 may be formed from a material having a high thermal conductivity, such as, for example, aluminum, which will facilitate heating and cooling of the molding material in the interior of mold assembly 18.

According to some embodiments, lower relief 34 and upper relief 40 may be configured such that the cross-section of the tire molded in mold assembly 18 increases with the radius of the tire. For example, the cross-section of the tire may be wider adjacent the tire tread than adjacent hub 16. For example, the cross-section may have a substantially trapezoidal shape. It is contemplated that the cross-section has other shapes, such as, for example, concave, convex, and parallelogram shapes.

Figure 3:
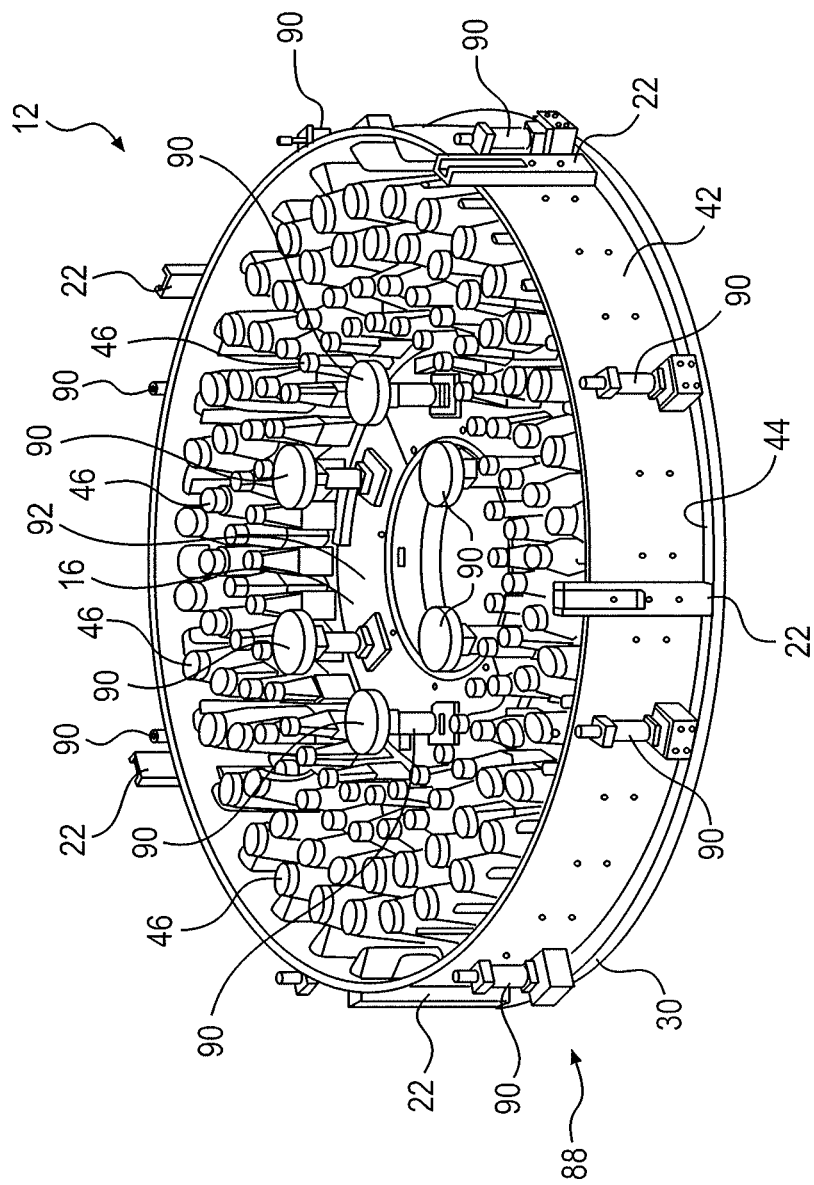
FIG. 3 is a perspective view of an exemplary embodiment of a lower mold portion of the exemplary embodiment shown in FIG. 1.

As shown in FIG. 3, exemplary lower mold portion 12 includes a lower circular barrier 42 coupled to lower face plate 30. Exemplary lower circular barrier 42 is substantially perpendicular to lower face plate 30 and corresponds to a portion of an outer circumferential surface of the tire being molded. As shown in FIG. 3, guide receivers 22 are coupled to an outer circumferential surface of lower circular barrier 42. According to some embodiments, lower face plate 30 has a slightly larger diameter than lower circular barrier 42, resulting in a lower flange 44 of lower face plate 30 extending beyond the lower edge of lower circular barrier 42 at an outer periphery of lower mold portion 12.

Figure 4:
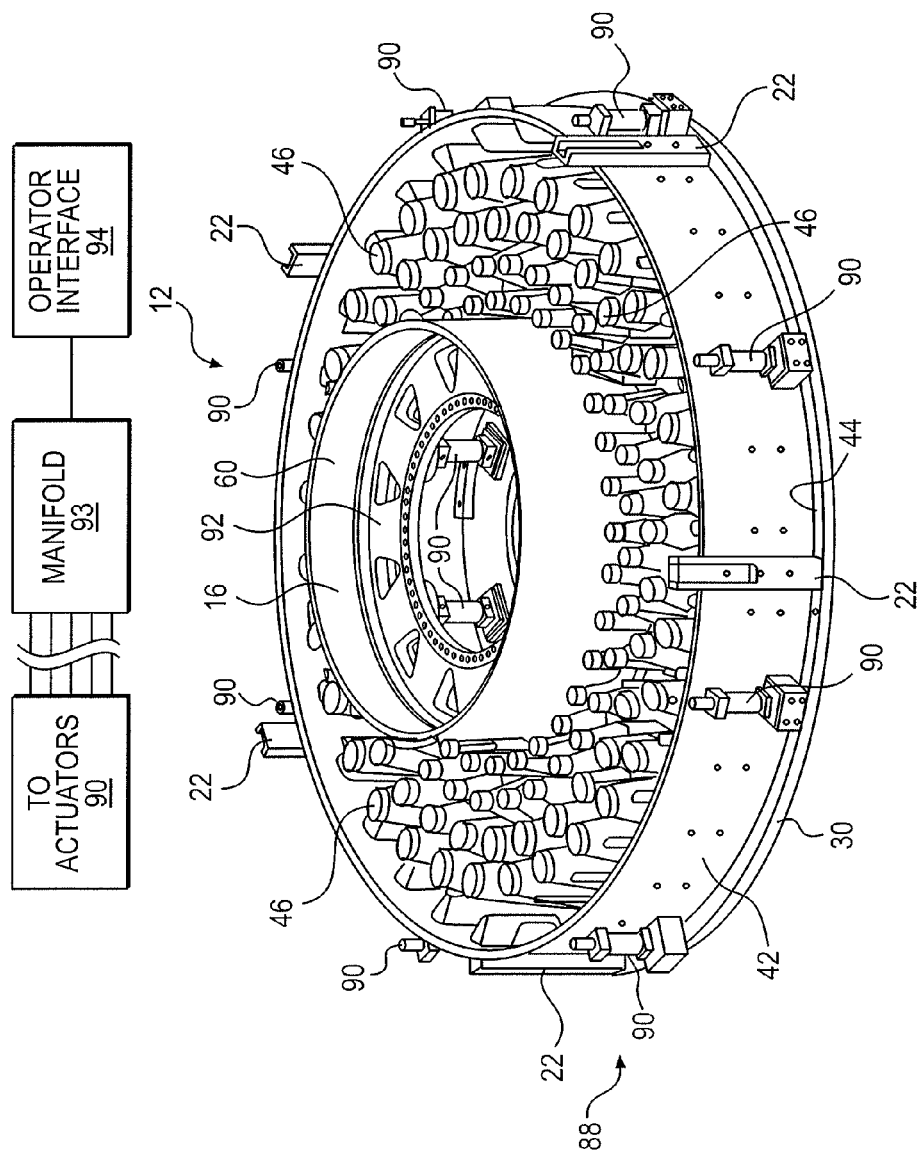
FIG. 4 is a perspective view of the exemplary embodiment shown in FIG. 3 with an exemplary embodiment of a hub placed in the lower mold portion.

In the exemplary embodiment shown in FIG. 3, lower mold portion 12 also includes a plurality of lower projections 46 that are coupled to and extend from lower face plate 30. Lower projections 46 are configured to create cavities in the tire molded in mold assembly 18. According to some embodiments, lower projections 46 taper as they extend from lower face plate 30. As a result, the cavities formed in the molded tire are tapered, such that they have a smaller cross-section at the axially intermediate region than at the outer sides of the tire. This may facilitate removing the tire from the mold following molding and/or may provide desired performance characteristics of the tire. As shown in FIG. 4, some embodiments of lower mold portion 12 are configured to receive hub 16. In the exemplary embodiment shown, lower projections 46 are arranged around hub 16 in a number of concentric circles.

Figure 5:
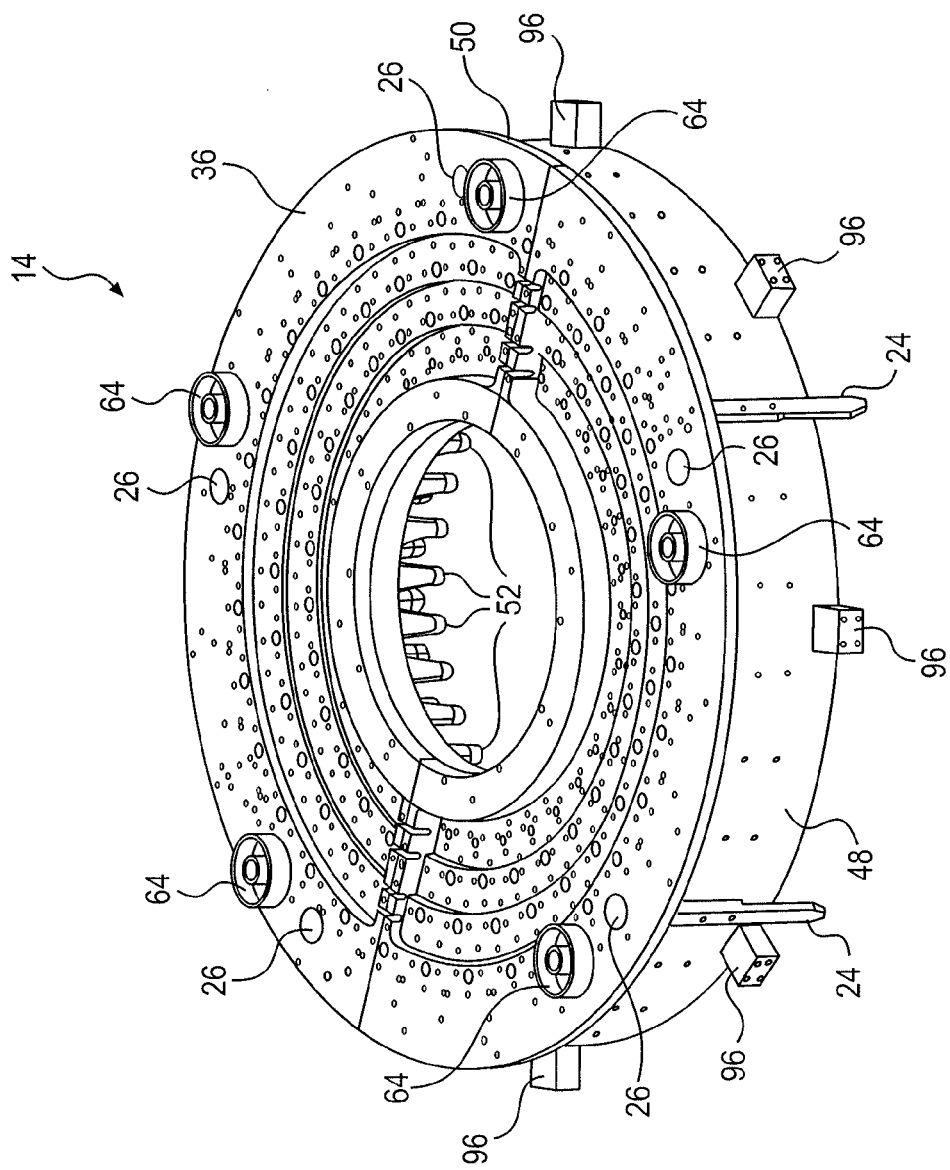
FIG. 5 is a perspective view of an exemplary embodiment of an upper mold portion of the exemplary embodiment shown in FIG. 1.
Figure 6:
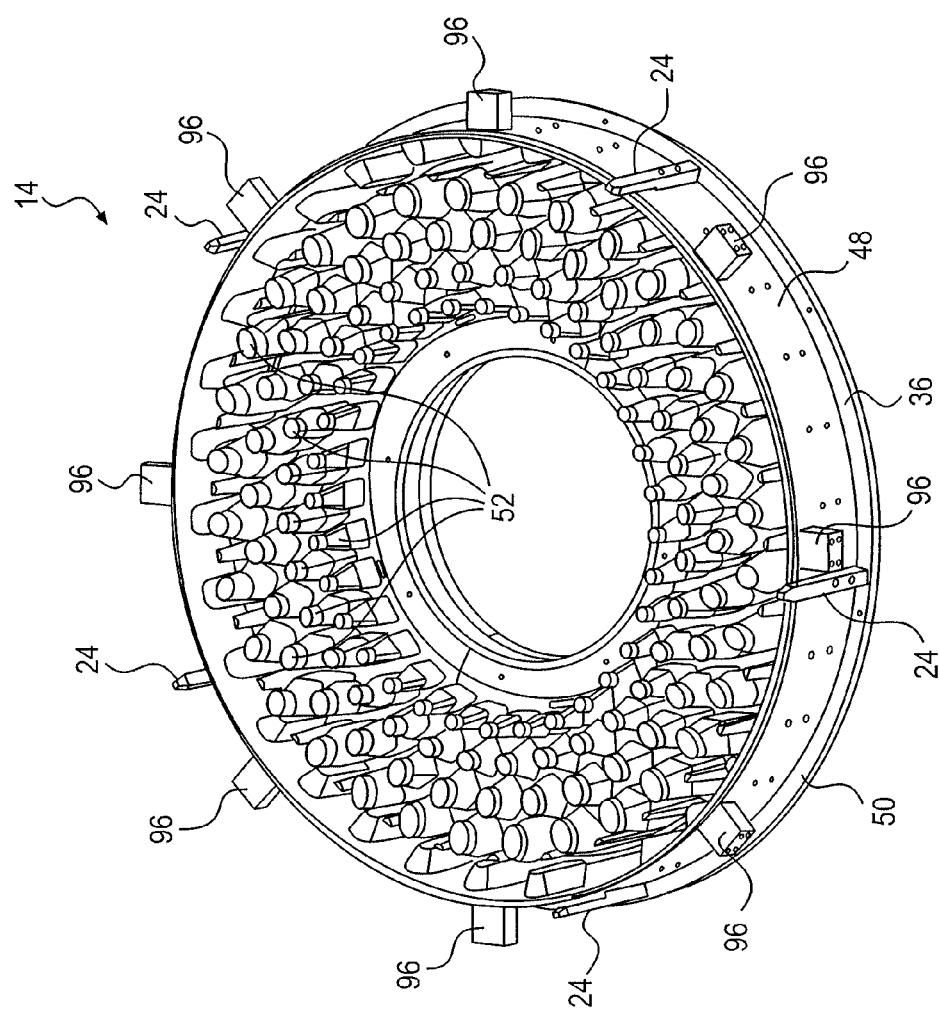
FIG. 6 is a perspective view of the exemplary upper mold portion shown in FIG. 5 showing its interior.

FIGS. 5 and 6 show an exemplary embodiment of upper mold portion 14. Similar to lower mold portion 12, upper mold portion 14 includes an upper circular barrier 48 coupled to upper face plate 36. Exemplary upper circular barrier 48 is substantially perpendicular to upper face plate 36 and corresponds to a portion of an outer circumferential surface of the tire being molded. As shown in FIG. 5, guide pins 24 are coupled to an outer circumferential surface of upper circular barrier 48. According to some embodiments, upper face plate 36 has a slightly larger diameter than upper circular barrier 48, resulting in an upper flange 50 of upper face plate 36 extending beyond the upper edge of upper circular barrier 48 at an outer periphery of upper mold portion 14.

In the exemplary embodiment shown in FIG. 6, upper mold portion 14 also includes a plurality of upper projections 52 that are coupled to and extend from upper face plate 36. Upper projections 52 are configured to create cavities in the tire molded in mold assembly 18. According to some embodiments, upper projections 52 taper as they extend from upper face plate 36. As a result, the cavities formed in the molded tire are tapered, such that they have a smaller cross-section at the axially intermediate region than at the outer sides of the tire. This may facilitate removing the tire from the mold following molding and/or may provide desired performance characteristics of the tire. As shown in FIG. 6, some embodiments of upper mold portion 14 have upper projections 52 that are arranged around an inner diameter of upper face plate 36 in a number of concentric circles. According to some embodiments, the concentric circles of the lower mold portion 12 and the upper mold portion 14 may correspond to one another, such that at least some of the ends of lower projections 46 are aligned with at least some of the ends of upper projections 52.

Figure 7:
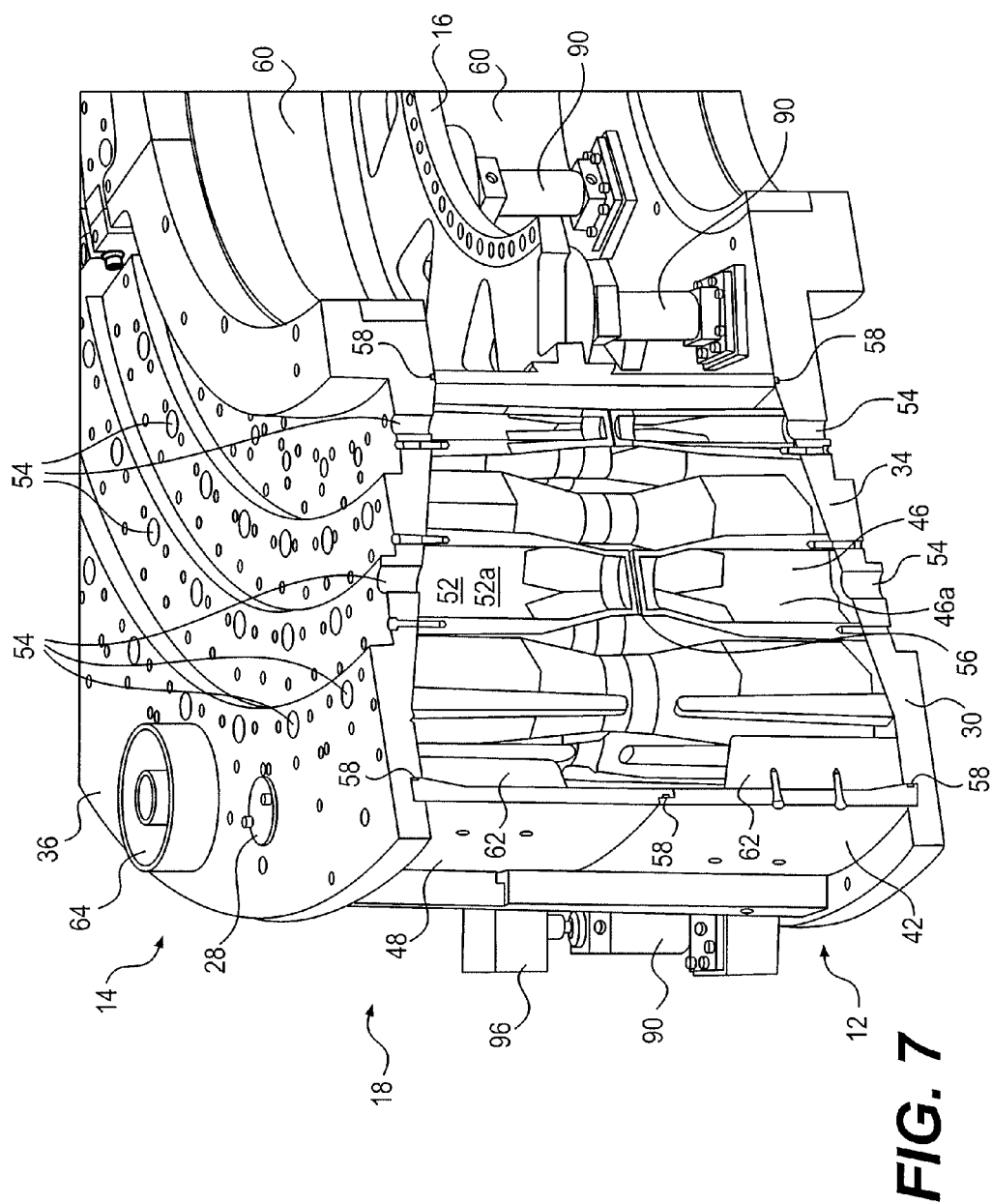
FIG. 7 is a partial perspective section view of the exemplary embodiment of the system shown in FIG. 1.

As shown in FIG. 7, at least some of lower projections 46 and upper projections 52 are hollow. According to some embodiments, at least some of lower projections 46 and upper projections 52 are formed from a material having a high thermal conductivity, such as, for example, aluminum (e.g., cast aluminum). Such construction may facilitate heating and cooling of the molding material in the interior of mold assembly 18. According to some embodiments, lower face plate 30 and upper face plate 36 may include a plurality or apertures 54 that correspond to the location of at least some of lower projections 46 and upper projections 52. In such embodiments, the interiors of the hollow portions of projections 46 and 52 are in flow communication with the exterior of mold assembly 18 via apertures 54. Such construction may facilitate heating and cooling of the molding material in the interior of mold assembly 18.

According to some embodiments, at least some of lower projections 46 and upper projections 52 may be coupled to the respective interior surfaces of lower face plate 30 and upper face plate 36, for example, via fasteners such as bolts and/or adhesive. According to some embodiments, at least some of lower projections 46 and upper projections 52 or respective face plates 30 and 36 may be configured to receive an o-ring or gasket to provide a fluid seal, so that molding material does not leak from the interior of mold assembly 18 during molding.

As shown in FIG. 7, at least some of projections 46 and 52 may have cross-sections that change area and/or shape as projections 46 and 52 extend away from respective face plates 30 and 36. For example, at least some of projections 46 and 52 have a cross-section that reduces as projections 46 and 52 extend away from respective face plates 30 and 36. According to some embodiments, at least some of projections 46 and 52 have a cross-section that changes shape as projections 46 and 52 extend away from respective face plates 30 and 36. For example, as shown in FIG. 7, the cross-sections of projections 46a and 52a have both a parallelogram shape adjacent respective face plates 30 and 36, and a circular or elliptical shape at the distal ends of projections 46a and 52a.

According to some embodiments, spacers may be located between the ends of at least some of lower projections 46 and some of upper projections 52. For example, as shown in FIG. 7, at least some of the ends of projections 46 and 52 may be spaced from one another by a gap (e.g., about 6 mm). For example, as shown in FIG. 7, a spacer 56 is provided between the ends of projection 46a and projection 52a. Such spacers 56 may be formed from a material resistant to adhesion with the molding material, such as, for example, silicone wafers. According to some embodiments, spacers 56 may be secured to ends of either lower projections 46 or ends of upper projections 52 via, for example, adhesive. For example, spacers 56 may be formed from, for example, a sheet of adhesive-backed silicone. Spacers 56 may prevent molding material from seeping in between the aligned ends of projections 46 and 52 during molding, such that cavities formed in the molded tire extend from one side of the tire to the other in a substantially uninterrupted manner.

The exemplary embodiment shown in FIG. 7 includes a number of seals 58 configured to provide a fluid seal between the various parts of system 10. For example, hub 16 includes a circumferential flange 60. Lower mold portion 12 includes a seal 58 adjacent a lower end of flange 60, and upper mold portion 14 includes a seal 58 adjacent an upper end of flange 60. This exemplary configuration results in hub 16 being confined between lower mold portion 12 and upper mold portion 14 in a sealed manner, such that hub 16 can be molded directly into the molded tire. In the exemplary embodiment shown in FIG. 7, seals 58 are also provided between lower face plate 30 and lower circular barrier 42, between upper face plate 36 and upper circular barrier 48, and at the junction of lower circular barrier 42 and upper circular barrier 48. As a result of this exemplary configuration, lower mold portion 12, upper mold portion 14, and hub 16 define a substantially fluid tight interior of mold assembly 18.

Figure 8:
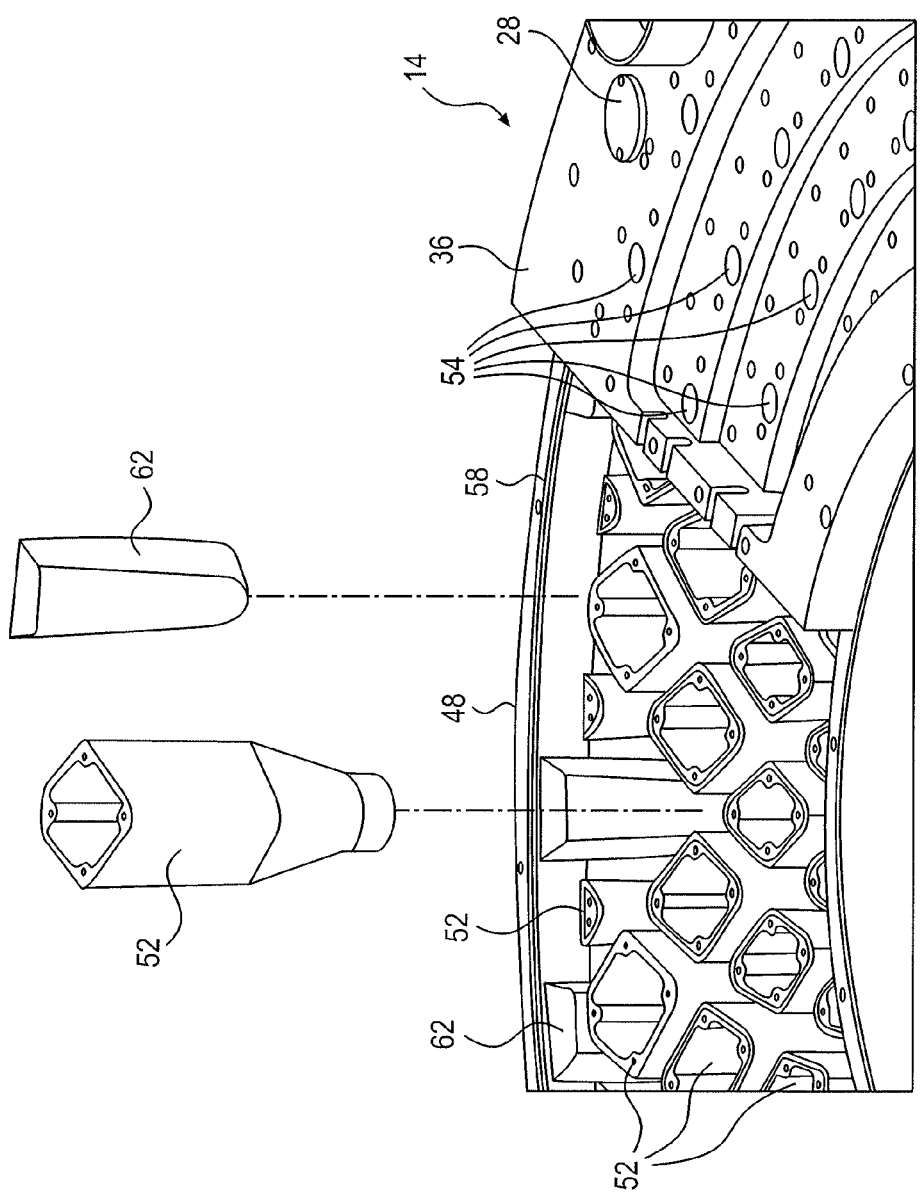
FIG. 8 is a partial perspective view of the exemplary embodiment of the upper mold portion shown in FIG. 5 with a portion removed to show its interior.

As shown in FIGS. 7 and 8, the projections 46 and 52 in different concentric circles of lower and upper mold portions 12 and 14 have different cross-sections. For example, projections 46 and 52 of different concentric circles have different cross-sections at at least one point along the lengths of the respective upper and lower projections 46 and 52.

As shown in FIGS. 7 and 8, exemplary system 10 includes a plurality of lugs 62 coupled to the interior sides of lower circular barrier 42 and upper circular barrier 48. Exemplary lugs 62 provide a tread relief corresponding to grooves in the tread of the molded tire. According to some embodiments, lugs 62 are solid or hollow and may be formed from a material having a high thermal conductivity, such as, for example, aluminum.

Figure 9:
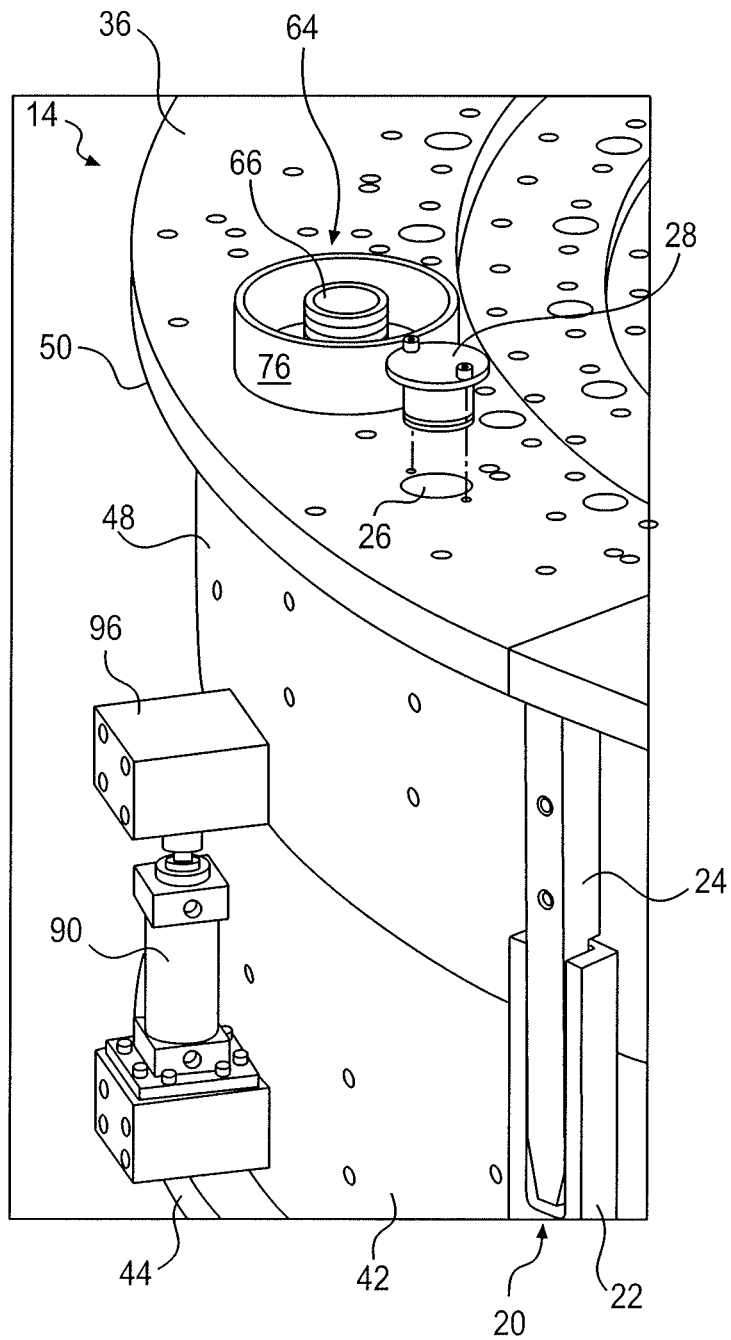
FIG. 9 is partial perspective view of a portion of an exemplary system for separating a molded tire from a mold.
Figure 10:
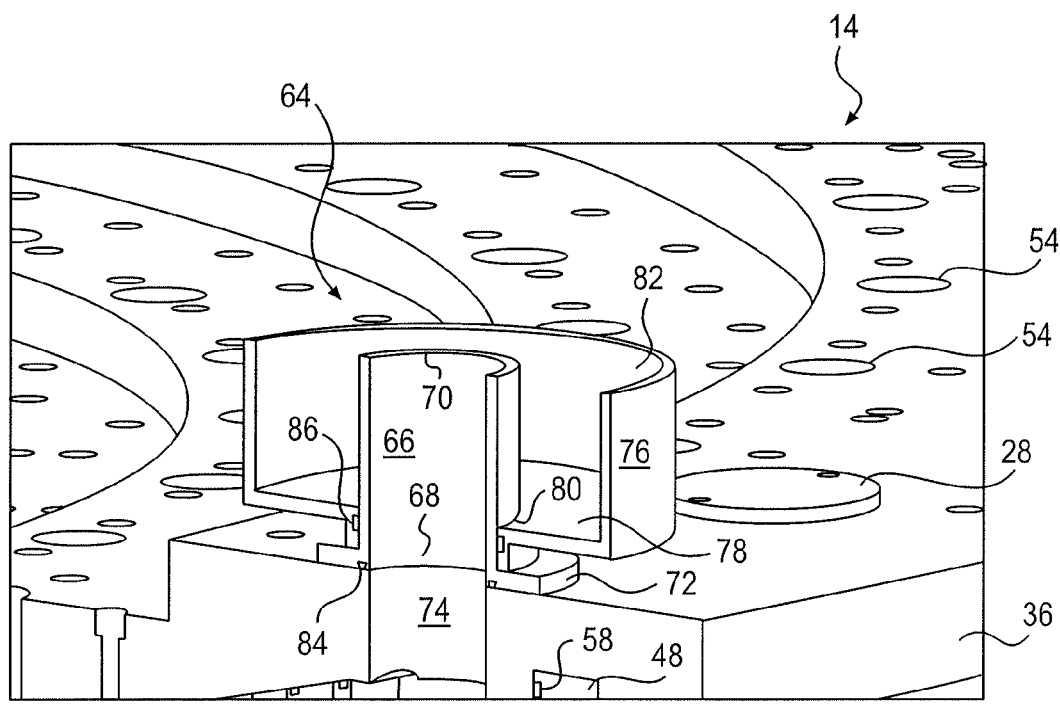
FIG. 10 is partial perspective section view of an exemplary embodiment of a reservoir for catching a portion of overflow of molding material during molding.

As shown in FIGS. 9 and 10, some embodiments of system 10 include a plurality of reservoirs 64 for catching a portion of overflow of molding material during molding. For example, system 10 may include a number of circumferentially spaced reservoirs 64 (see FIG. 1). Exemplary reservoirs 64 include a tubular portion 66 having a proximal end 68 adjacent upper face plate 36 and a distal end 70 remote from upper face plate 36. Reservoir 64 also includes a flange 72 associated with proximal end 68 of tubular portion 66. Flange 72 is configured to be coupled to upper face plate 36 in flow communication with the interior of mold assembly 18 via an aperture 74 in upper face plate 36. Flange 72 may be coupled to upper face plate 36 via, for example, adhesive and/or fasteners such as bolts, such that tubular portion 66 extends substantially perpendicular to the surface of upper face plate 36. According to some embodiments, reservoir 64 includes a reservoir portion 76 configured to be removably mounted around tubular portion 66. Reservoir portion 76 includes a base 78 having an aperture 80 configured to receive tubular portion 66, and a wall 82 configured such that molding material flowing from distal end 70 of tubular portion 66 is received in reservoir portion 76. According to some embodiments, reservoir 64 includes a seal member 84 associated with proximal end 68 of tubular portion 66 and flange 72. Seal member 84 is configured to provide a fluid seal between reservoir 64 and upper face plate 36. According to some embodiments, reservoir portion 76 is configured to slide along tubular portion 66 from distal end 70 toward proximal end 68 and flange 72. Reservoir 64 may include a seal member 86 associated with aperture 80 of base 78 of reservoir portion 76, with seal member 86 being configured to provide a fluid seal between reservoir portion 76 and tubular portion 66.

According to some embodiments, tubular portion 66 and the reservoir portion 76 are configured such that following receipt of an overflow of molding material, reservoir portion 76 is configured to slide on tubular portion 66 toward distal end 70 and separate from tubular portion 66, thereby facilitating removal of the overflow from mold assembly 18. This may prevent overflow of molding material from spilling onto and spreading across upper face plate 36. This also reduces the surface area of the hot molding material, which reduces the release of gas and potentially undesirable fumes associated with the molding material.

According to some embodiments, distal end 70 of tubular portion 66 may include threading (e.g., see FIG. 9) configured to threadedly engage threads of a fluid coupling. Such threading may be on the inner or outer surface of tubular portion 66. Such a configuration may enable a conduit or hose to be coupled to tubular portion 66, so that molding material can be supplied to the interior of mold assembly 18 via aperture 74 in upper face plate 36. According to some embodiments, one or more of reservoirs 64 may include such a configuration. According to such embodiments, after molding material has been supplied to the interior of mold assembly 18, the conduit or hose may be de-coupled from tubular portion 66, and reservoir 64 may be used to catch overflow of molding material. According to some embodiments, tubular portion 66 may have a relatively extended length.

According to some embodiments, system 10 may include a separating system 88 for separating a molded tire from mold assembly 18. For example, as shown in FIG. 1, separating system 88 includes a plurality actuators 90 associated with one or more of an inner diameter of mold assembly 18 and an outer periphery of one or more of lower mold portion 12 and upper mold portion 14, such that actuators 90 are spaced circumferentially about mold assembly 18. Separating system 88 may include a manifold 93 (FIG. 4) providing flow communication with each of actuators 90. According to some embodiments, separating system 88 includes an operator interface 94 (FIG. 4) associated with manifold 93. Operator interface 94 may be configured to facilitate activation of all of the actuators 90 simultaneously or independently from one another (i.e., operator interface 94 may be able to both activate of all of the actuators 90 simultaneously and activate actuators 90 independently from one another). For example, following molding of the tire, when the tire is still in the interior of mold assembly 18, all of actuators 90 may be simultaneously activated in order to pop apart upper mold portion 14 from lower mold portion 12 and the molded tire. In addition, operator interface 94 may be configured to facilitate selective activation of actuators 90 in a circumferential sequence about lower mold portion 12 and upper mold portion 14 in order to facilitate separating upper mold portion 14 from lower mold portion 12 and the molded tire. According to some embodiments, operator interface 94 may be any device, mechanical and/or electronic, configured to control manifold 93.

According to some embodiments, a plurality of actuators 90 is placed between a portion of hub 16 (e.g., an inner portion 92) and upper mold portion 14 at the inner diameter of mold assembly 18, such that activation of the plurality of actuators 90 separates upper mold portion 14 from hub 16. According to some embodiments, for example, as shown in FIGS. 1, 3, and 4, a plurality of actuators 90 is placed between lower mold portion 12 and a portion of hub 16 (e.g., inner portion 92), such that activation of the plurality of actuators 90 separates the molded tire from lower mold portion 12. For example, actuators 90 may extend between an inner diameter of lower face plate 30 and hub 16. According to some embodiments, a plurality of actuators 90 is placed at the outer periphery of lower mold portion 12 and the outer periphery of upper mold portion 14, such that upper mold portion 14 is separated from lower mold portion 12 upon activation of at least some of actuators 90. For example, actuators 90 may be coupled to an outer surface of lower circular barrier 42, and corresponding stop blocks 96 may be coupled to the outer surface of upper circular barrier 48, and when actuators 90 are activated, they project against respective stop blocks 96, thereby separating upper mold portion 14 from lower mold portion 12. Alternatively, or in addition, portable actuators may be placed around the outer periphery of mold assembly 18, for example, between lower flange 44 of lower face plate 30 and stop blocks 96 or upper flange 50 of upper face plate 36. According to some embodiments, actuators 90 may be located at one or more of the above-referenced positions and activated in a coordinated manner to separate upper mold portion 14 from lower mold portion 12, and thereafter, to separate the molded tire from lower mold portion 12. According to some embodiments, actuators 90 may be pneumatic actuators and/or hydraulic actuators, or any other actuators known to those skilled in the art, such as, for example, mechanical screws. According to some embodiments, eye-bolts (not shown) may be secured to upper face plate 36, and hoists may be used to lift upper mold portion 14 off lower mold portion 12 and the molded tire.

Figure 11:
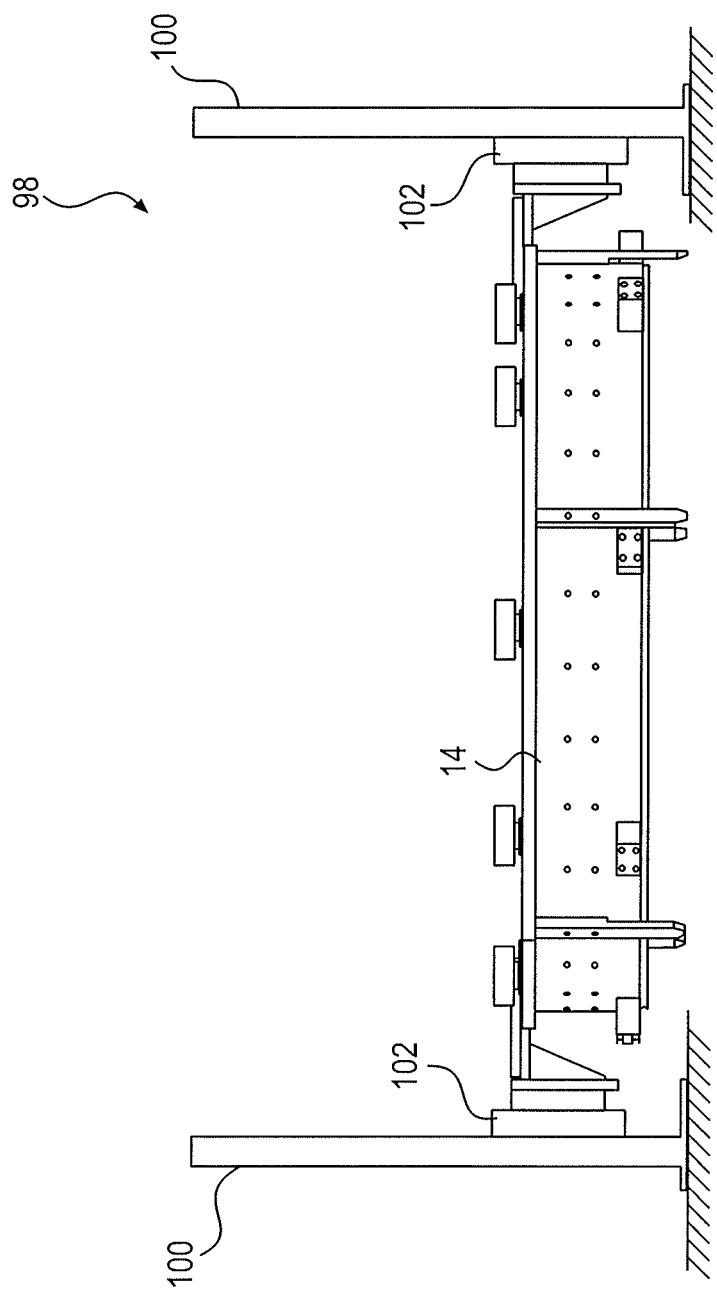
FIG. 11 is a side view of an exemplary embodiment of an apparatus for lifting and re-orienting an upper mold portion, with the exemplary upper mold portion shown in FIG. 5 oriented in a substantially horizontal orientation.
Figure 12:
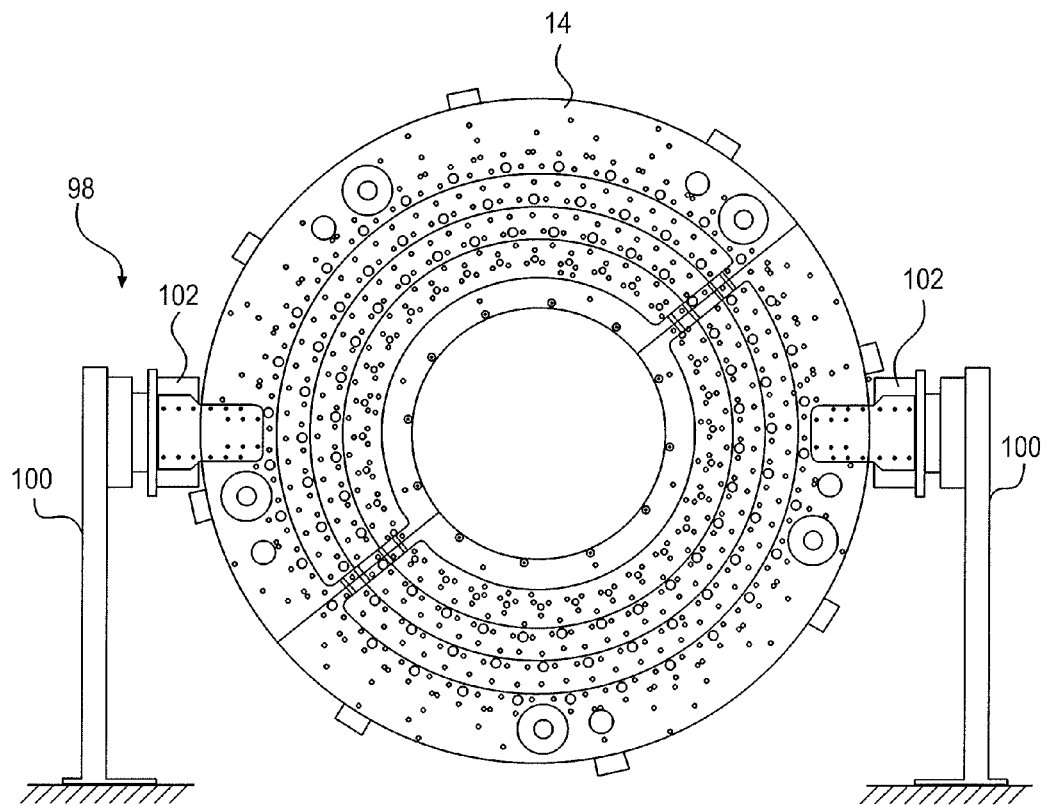
FIG. 12 is a side view of the exemplary apparatus shown in FIG. 11, with the exemplary upper mold portion oriented in a substantially vertical orientation.

As shown in FIGS. 11 and 12, system 10 may include a lift apparatus 98 configured to be coupled to upper mold portion 14 and lift upper mold portion 14 from lower mold portion 12. For example, exemplary lift apparatus 98 shown in FIGS. 11 and 12 includes a pair of opposing columns 100, each provided with a mounting fixture 102 configured to be coupled to opposing sides of upper mold portion 14. According to some embodiments, columns 100 include an actuator (not shown) configured to raise and lower mounting fixtures 102. For example, FIG. 11 shows mounting fixtures 102 in a lowered position and coupled to opposing sides of upper mold portion 14, and FIG. 12 shows mounting fixtures 102 in a raised position and coupled to opposing sides of upper mold portion 14.

According to some embodiments, mounting fixtures 102 are configured to revolve, so that upper mold portion 14 may be re-oriented. For example, as shown in FIG. 11, mounting fixtures 102 are coupled to upper mold portion 14, and mounting fixtures 102 are in a rotational position such that upper mold portion 14 is in a substantially horizontal orientation. This orientation facilitates placing upper mold portion onto lower mold portion 12, for example, when assembling mold assembly 18, and removing upper mold portion 14 from lower mold portion 12, for example, when separating upper mold portion 14 from lower mold portion 12 following the molding of a tire.

As shown in FIG. 12, mounting fixtures 102 are in a rotational position such that upper mold portion 14 is in a substantially vertical orientation. This orientation facilitates cleaning, servicing, and/or treating upper mold portion 14 between molding operations. For example, following molding of a tire, mounting fixtures 102 may be raised and rotated so that upper mold portion 14 is in a substantially vertical orientation. Prior to returning upper mold portion 14 onto lower mold portion 12, the interior surfaces of upper mold portion may be treated with a mold release agent to facilitate separation of upper mold portion 14 from lower mold portion 12 and the molded tire following a molding operation.

Some embodiments of system 10 may include a system 104 for monitoring the temperature of portions of the molding material and/or a molded tire. For example, exemplary system 104 shown in FIG. 13 includes a plurality of temperature sensors 106 configured to provide signals indicative of the temperature of the molding material and/or the molded tire at the location associated with the respective temperature sensor. For example, temperature sensors 106 may provide signals indicative of the temperature of the molding material during molding of the tire, which may facilitate improved molding during heating and curing of the molding material in mold assembly 18. In addition, temperature sensors 106 may provide signals indicative of the temperature of the material of a molded tire associated with the respective temperature sensor during operation of a machine on which the tire is installed. Such signals may be beneficial during testing of the tire and/or during the service life of the tire, for example, for predicting wear or the useful life of the tire.

Figure 13:
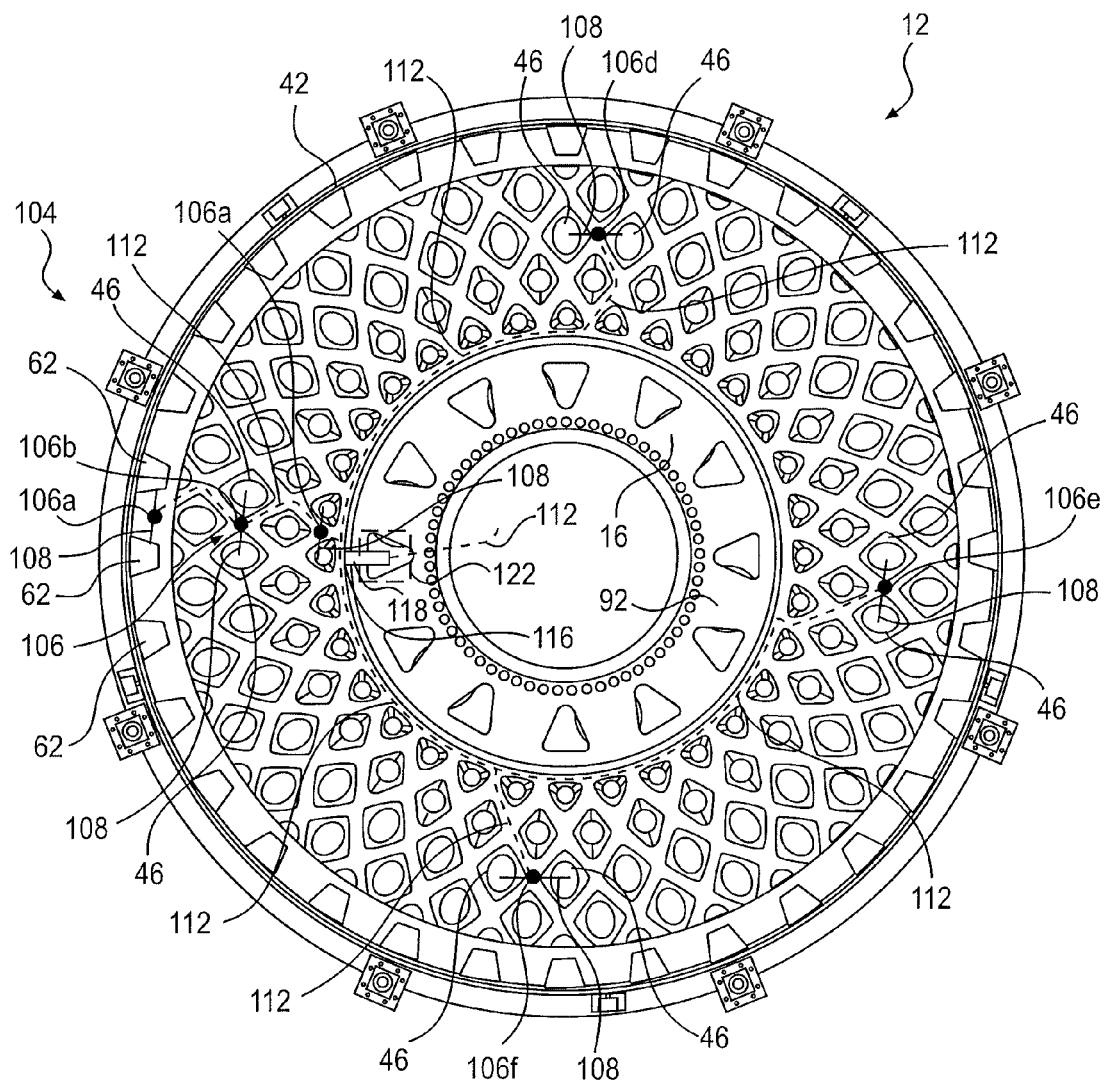
FIG. 13 is a top view of an exemplary embodiment of a lower mold portion including an exemplary embodiment of a system for monitoring the temperature of portions of the molding material and/or molded tire.
Figure 14:
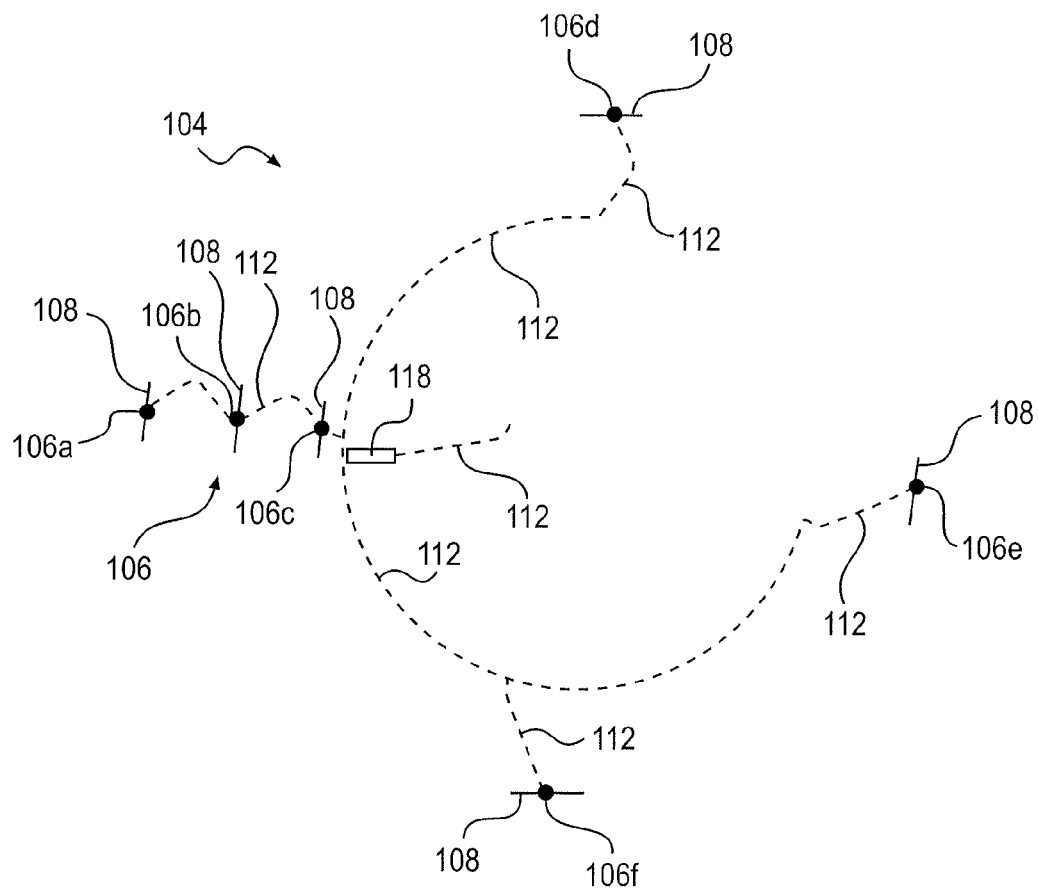
FIG. 14 is a schematic top view of an exemplary layout of the exemplary embodiment shown in FIG. 13.
Figure 15:
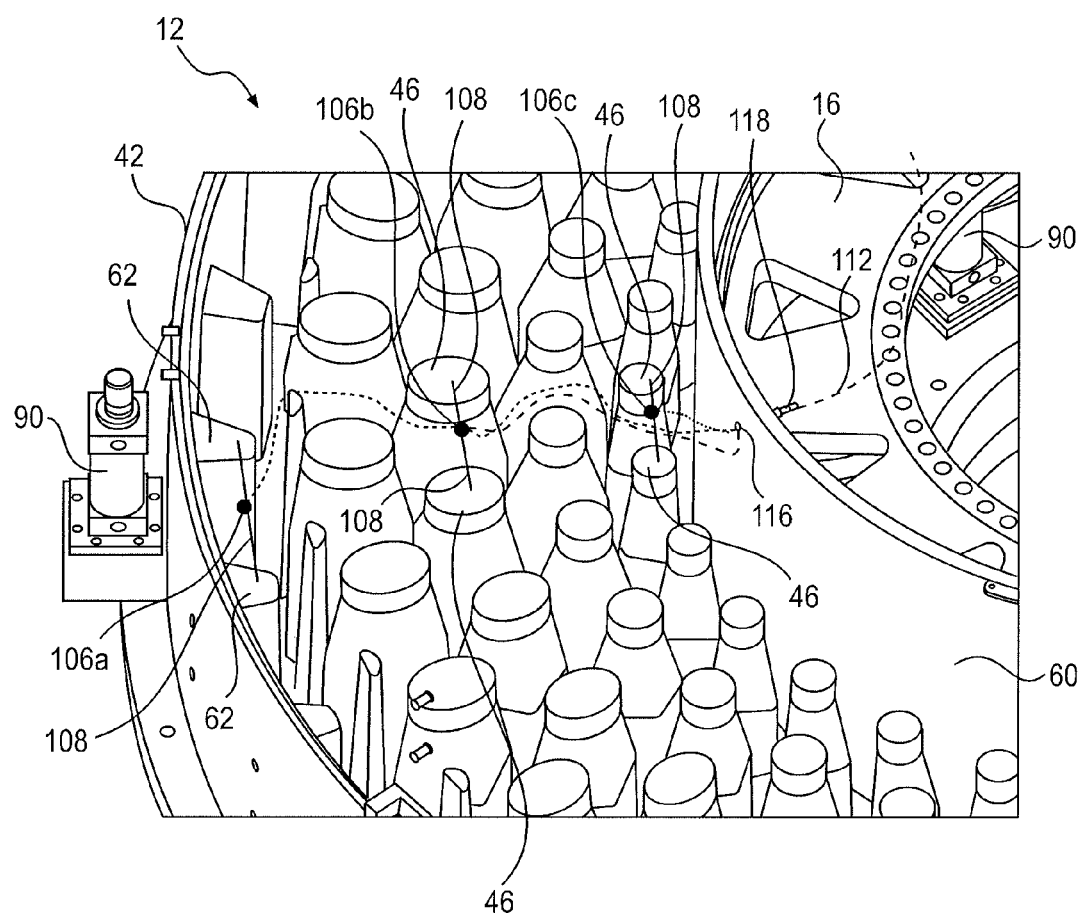
FIG. 15 is a partial perspective view of the exemplary embodiment shown in FIG. 13.

According to some embodiments, the plurality of temperature sensors 106 may be located at different radial positions in mold assembly 18, for example, as shown in FIGS. 13-15. As shown, temperature sensors 106a, 106b, and 106c are located at different radial positions in mold assembly 18. According to some embodiments, system 104 may include a plurality of temperature sensors 106 located at different circumferential positions in mold assembly 18, as shown in FIGS. 13-15. These exemplary configurations may provide useful information about possible temperature gradients of the molding material at different locations of mold assembly 18 during molding of the tire. This may facilitate ensuring that the majority of the molding material is within a desired temperature range during various portions of the molding process, for example, during heating, curing, and cooling. This may be particularly beneficial when mold assembly 18 is very large, and the volume of molding material is high. In addition, during operation of a machine on which the molded tire is installed, it may be beneficial to be aware of temperature gradients associated with different radial or circumferential locations. For example, temperatures may be higher closer to the outer radial edge of the tire due to a greater magnitude of deflection of the tire closer to the tread.

As shown in FIGS. 13-15, exemplary system 104 includes three temperature sensors 106a-106c, with temperature sensor 106a being suspended (prior to supplying molding material to mold assembly 18) in lower mold portion 12 between two adjacent lugs 62. In addition, temperature sensor 106b is suspended between two adjacent lower projections 46, and temperature sensor 106c is suspended between two adjacent lower projections 46, with temperature sensor 106b being radially located between temperature sensors 106a and 106c, with temperature sensor 106c being closest to flange 60 of hub 16. In the exemplary embodiment shown, temperature sensors 106a-106c are located at substantially the same circumferential position.

Exemplary system 104 also includes three temperature sensors 106d-106f, with temperature sensor 106d being suspended between two adjacent lower projections 46 in lower mold portion 12 at a circumferential position about 90 degrees clockwise from temperature sensors 106a-106c. According to the exemplary embodiment shown, temperature sensor 106d is located radially at a position generally central with respect to flange 60 of hub 16 and lower circular barrier 42. Similarly, temperature sensor 106e is suspended between two adjacent lower projections 46 at a circumferential position about 90 degrees clockwise from temperature sensor 106d, and located radially at a position generally central with respect to flange 60 and lower circular barrier 42. Temperature sensor 106f is suspended between two adjacent lower projections 46 at a circumferential position about 90 degrees clockwise from temperature sensor 106d, and located radially at a position generally central with respect to flange 60 and lower circular barrier 42. Such an exemplary arrangement of temperature sensors 106a-106f may facilitate obtaining temperature information relating to a wide range radial and circumferential locations, and may be beneficial for determining undesirable temperature gradients associated with a particular radial or circumferential position of mold assembly 18 or the molded tire. For example, in the formation of larger tires, temperatures at various locations within the oven used to heat and/or cure the tire may be different due to the size of the oven required. Incorporating sensors at various locations within the tire, for example, within quadrants of the tire as depicted in FIGS. 13 and 14, may allow a technician to monitor the temperatures and verify that all areas of the tire have been subjected to the desired heat treatment.

According to some embodiments, prior to supplying molding material to mold assembly 18, temperature sensors 106 may be suspended between lugs 62 and/or lower projections 46 via a line 108, such as, for example, string, wire, thread, or monofilament line. For example, temperature sensors 106 may be coupled to (e.g., tied to) monofilament line, and the monofilament line 108 may be coupled to the ends of lugs 62 and/or lower projections 46 via, for example, adhesive and/or clips (see FIGS. 13-15). Temperature sensors 106 may be associated with mold assembly 18 in other ways. By suspending temperature sensors between lugs 62 and/or lower projections 46, the temperature reading of the molding material may be less likely to be affected by the temperature of mold assembly 18.

Figure 16:
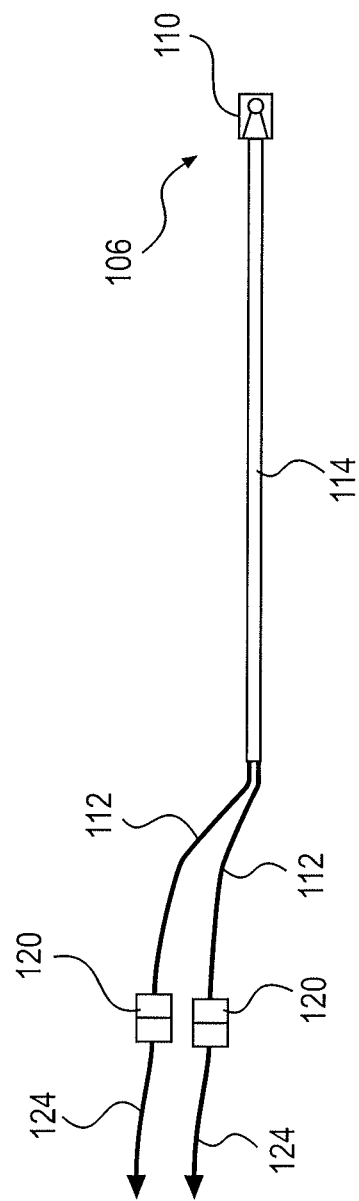
FIG. 16 is a schematic view of an exemplary embodiment of a temperature sensor and associated leads.

According to some embodiments, temperature sensors 106 are thermocouples. Other types of temperature sensors are contemplated. As shown in FIG. 16, temperature sensors 106 may include a transducer portion 110 for measuring temperature and electric leads 112 (e.g., two leads) that may pass through a protective sheath 114 configured to protect leads 112 from the heated molding material. As shown in FIGS. 13-15, hub 16 (e.g., at flange 60) may include an aperture 116, so that leads 112 can exit the interior of mold assembly 18. According to some embodiments, a tubular element 118 (e.g., a small portion of pipe) may be coupled to aperture 116 to provide a conduit for leads 112 exiting mold assembly 18.

Figure 17:
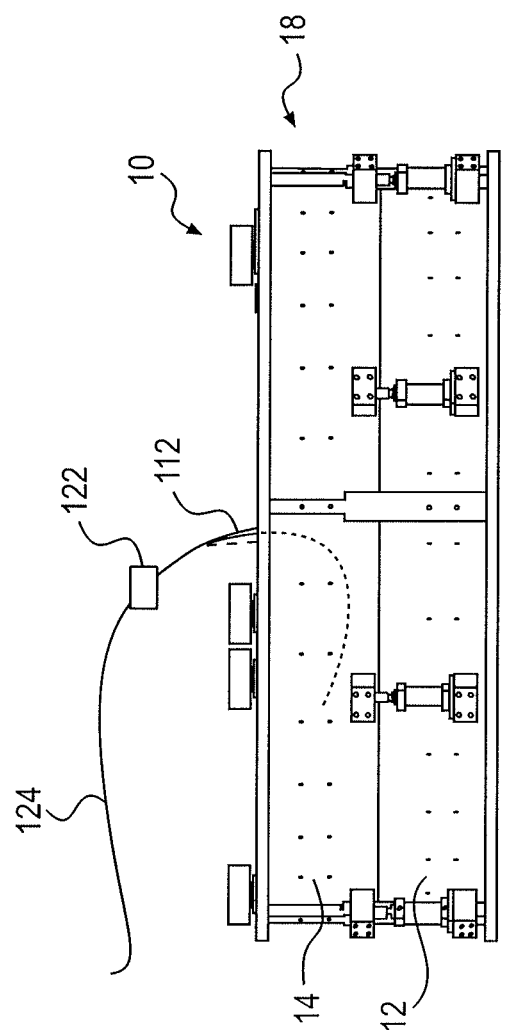
FIG. 17 is a side view of an exemplary embodiment of a system for monitoring the temperature of portions of the molding material and/or molded tire.

According to some embodiments, leads 112 may be provided with couplers 120, such as plugs. The portion of leads 112 between the end of sheath 114 and couplers 120 may be configured to be housed in a protective housing 122 (see e.g., FIG. 17), which may be received in, for example, a hollow portion of hub 16. According to some embodiments, couplers 120 may be electrically coupled to housing 122 (or directly to couplers 120 (see FIG. 16)), and housing 122 may include couplers (not shown) for coupling to extensions 124 (see FIG. 17), so that the signals from leads 112 may be provided to a receiving unit configured to analyze and/or display temperature information received from temperature sensors 106.

During a molding process, hot molding material may be supplied to the interior of mold assembly 18, and temperature sensors 106, as a result of being suspended between lugs 62 and/or lower projections 46, are surrounded by the molding material and provide signals indicative of the temperature of the molding material surrounding the respective temperature sensor. Following the molding process, temperature sensors 106 remain embedded in the hardened molding material and can be used to provide signals indicative of the temperature of the tire during operation.

INDUSTRIAL APPLICABILITY

The exemplary system 10 for molding non-pneumatic tires disclosed herein may be used to manufacture tires for machines configured to travel across terrain. Such machines may include any type of ground-borne vehicle, such as, for example, an automobile, a truck, an agricultural vehicle, and/or a construction vehicle, such as, for example, a wheel loader, a dozer, a skid-steer loader, an excavator, a grader, an on-highway truck, an off-highway truck, and/or any other vehicle type known to a person skilled in the art. In addition to self-propelled machines, such machines may be any device configured to travel across terrain via assistance or propulsion from another machine.

The exemplary system 10 may be used in the following exemplary manner to manufacture molded, non-pneumatic tires. The exemplary method may include placing lower mold portion 12 on a device such as a cart that facilitates movement of lower mold portion 12. According to some embodiments, the surfaces of the interior of lower mold portion 12 may be treated with a mold release agent to reduce the likelihood of portions of the molded tire from adhering to lower mold portion 12. Similarly, the surface of the interior of upper mold portion 14 may be treated with a mold release agent. This may be facilitated by coupling upper mold portion 14 to a lift apparatus, for example, lift apparatus 98 described previously herein with respect to FIGS. 11 and 12. In particular, upper mold portion 14 may be oriented in a substantially vertical orientation for ease of access to its interior surface.

According to some embodiments, for example, embodiments in which hub 16 forms a seal with lower mold portion 12 and/or upper mold portion 14, hub 16 may be placed in lower mold portion 12, such that flange 60 forms a seal with lower mold portion 12, for example, as described previously with respect to FIG. 7. According to some embodiments, the outer circumferential surface of flange 60 may be treated with an agent for promoting adhesion between the molding material and flange 60 following the molding procedure.

According to some embodiments, spacers 56, such as, for example, silicone wafers, may be adhered on at least some ends of lower projections 46 of lower mold portion 12 (see FIG. 7). According to some embodiments, spacers 56 may be silicone wafers cut from a sheet of adhesive-backed silicone. This may serve to prevent molding material from seeping between the ends of lower projections 46 and upper projections 52, so that cavities are formed in the molded tire that extend between opposite sides of the tire in an uninterrupted manner.

According to some embodiments, as system 104 for monitoring the temperature of portions of the molding material and/or a molded tire may be installed in lower mold portion 12, for example, as described with respect to FIGS. 13-17. In particular, one or more temperature sensors 106 may be placed in lower mold portion 12 between adjacent lugs 62 and/or lower projections 46. Leads 112 from the one or more of temperature sensors 106 may be threaded through aperture 116 in flange 60 of hub 16 and tubular element 118. According to some embodiments, extensions 124 may be coupled to the ends of leads 124, so that temperature information can be obtained remotely from mold apparatus 18 during the heating, curing, and/or cooling processes described below.

According to some embodiments, lower mold portion 12 may be located under lift apparatus 98, for example, by moving lower mold portion 12 via a cart. Thereafter, upper mold portion 14 may be re-oriented so that it is substantially horizontal with upper projections 52 pointing down. Actuators of lift apparatus 98 may be activated to lower upper mold portion 14 onto lower mold portion 12, such that guide pins 24 are received in guide receivers 22 (see FIGS. 1 and 2), such that, according to some embodiments, upper mold portion 14 and flange 60 of hub 16 engage one another in a sealed manner (see FIG. 7) to form mold assembly 18.

According to some embodiments, mold assembly 18 may be heated prior to receiving the molding material. This may assist with preventing a portion of the molding material from cooling too quickly as the hot molding material contacts portions of the interior of mold assembly 18. According to some embodiments, mold assembly may be moved into an oven for heating, for example, via a cart on which lower mold portion 12 may be located. According to some embodiments, mold assembly 18 may be heated at from 150 to 200 degrees Celsius (e.g., 180 degrees C.) for from 2 to 3 hours (e.g., 2.5 hours). Thereafter, the temperature of the oven may be reduced may be reduced to from 100 to 140 degrees C. (e.g., 120 degrees C.) for from 1.5 hours to 2.5 hours (e.g., 2 hours). Thereafter, the temperature of the oven may be further reduced to from 60 to 100 degrees C. (e.g., 80 degrees C.).

According to some embodiments, the molding material may be preheated prior to being supplied to mold assembly 18. The molding material may be any moldable elastomeric material, such as, for example, urethane, natural rubber, synthetic rubber, or any combinations thereof. The molding material may include any known additives for improvement of performance and/or appearance. Prior to, or during, preheating, any known preparation methods such as, for example, mixing, agitating, degassing, and/or sample testing may be performed. The molding material may be preheated to from 30 degrees C. to 50 degrees C. (e.g., 40 degrees C.).

The temperature of the interior of mold assembly 18 may be measured, for example, using a infrared gun or other known methods. According to some embodiments, it may be desirable for the temperature of the interior to be greater than room temperature (e.g., about 24 degrees C.), but less than from 70 degrees C. to 90 degrees C. (e.g., about 80 degrees C.) prior to supplying the preheated molding material to the interior of mold assembly 18.

According to some embodiments, the molding material may be added to mold assembly 18 via apertures 26 in upper face plate 36 of upper mold portion 14. According to some embodiments, the molding material may be added via one or more of reservoirs 64, for example, as described previously with respect to FIGS. 9 and 10.

According to some embodiments, the interior of mold apparatus 18 should be completely filled. Overflow at reservoirs 64 and/or apertures 26 may be an indication that mold assembly 18 is completely filled. According to some embodiments, it may be desirable to fill mold assembly 18 expeditiously in order to take advantage of the preheating of mold assembly 18 and the molding material, for example, to reduced the likelihood of the molding material cooling to a temperature below a desired level. For example, the molding material may be added to mold assembly 18 at a rate of at least 180 lbs. per minute (e.g., at least 220 lbs. per minute, for example, 510 lbs. per minute). After mold assembly 18 has been filled, caps 28 may be secured over apertures 26 (see FIGS. 7-9).

According to some embodiments, the oven may be heated to a temperature ranging from 180 to 260 degrees C. (e.g., 220 degree C.), for example, while mold assembly 18 is being filled. When mold assembly 18 has been filled and the oven reaches the desired temperature, the filled mold assembly 18 may be moved into the oven. Thereafter, the filled mold assembly 18 may be heated in the oven for a first predetermined period time at a first temperature. For example, the filled mold assembly 18 may be heated at a first temperature, such that the temperature of the molding material ranges from 180 to 260 degrees C. (e.g., 220 degrees C.) for from 1 hour to 2 hours (e.g., 1 hour and 40 minutes). According to some embodiments, thereafter the temperature of the oven may be reduced so that the filled mold assembly is heated for a second predetermined period of time at a second temperature, such that the molding material has a temperature of from 130 to 170 degrees C. (e.g., 150 degrees C.) for from 15 hours to 20 hours (e.g., 18 hours).

According to some embodiments, determining the temperature of the molding material may be facilitated via the exemplary system 104 for monitoring the temperature of portions of the molding material, for example, as described previously with respect to FIGS. 13-17. For example, the molding method may include heating the filled mold assembly 18 until one or more of temperature sensors 106 indicates that the molding material has reached the first temperature, maintaining the temperature of the molding material at the first temperature for the first predetermined period of time, reducing the temperature of the molding material to a second temperature after the first predetermined period of time, and maintaining the molding material at the second temperature for the second predetermined period of time.

According to some embodiments, after the second predetermined period of time elapses, the filled mold assembly 18 may be removed from the oven. Thereafter, the molded tire may be removed from mold assembly 18 by separating upper mold portion 14 from lower mold portion 12, and separating the molded tire from lower mold portion 12. According to some embodiments, the molded tire may be removed from the mold before the mold and/or molded tire cool significantly.

According to some embodiments, the exemplary separating system 88 for separating the molded tire from mold assembly 18 may be used as described previously herein. For example, operator interface 94 and manifold 93 may be used to simultaneously activate actuators 90 to separate upper mold portion 14 from lower mold portion 12, and separate the molded tire from lower mold portion 12. For larger tires, simultaneous activation of actuators 90 may not result in sufficient separation of mold portions 12 and 14 to permit removal of the molded tire. Under such circumstances, it may be desirable to activate actuators 90 individually using operator interface 94 and manifold 93, in a sequence around the circumference of mold assembly 18, to work around its edge to promote separation. According to some embodiments, upper mold portion 14 may be lifted from lower mold portion 12 and the molded tire via exemplary lift apparatus 98. For example, mold assembly 18 may moved to a location beneath lift apparatus 98 (or lift apparatus 98 may be moved to a position above mold assembly 18), and mounting fixtures 102 may be secured to opposite sides of upper mold portion 14. Thereafter, actuators of lift apparatus 98 may be activated to raise upper mold portion 14 a sufficient height above lower mold portion 12 (or lower mold portion 12 may be moved from beneath lift apparatus 98), so that upper mold portion 14 may be re-oriented by mounting fixtures 102 to a substantially vertical orientation. Thereafter, this exemplary process may be repeated to form another tire.

It will be apparent to those skilled in the art that various modifications and variations can be made to the exemplary systems and methods. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A system for molding a non-pneumatic tire, the system comprising:
   a lower mold portion including:
      a lower face plate configured to provide a lower relief corresponding to a first side of the tire;
      a lower circular barrier coupled to the lower face plate and configured to correspond to a first portion of an outer circumferential surface of the tire; and
      a plurality of lower projections extending from the lower face plate and configured to correspond to cavities in the first side of the tire, wherein the lower projections taper as the lower projections extend from the lower face plate, and wherein at least some of the lower projections are hollow;
   an upper mold portion configured to be coupled to the lower mold portion, the upper mold portion including:
      an upper face plate configured to provide an upper relief corresponding to a second side of the tire;
      an upper circular barrier coupled to the upper face plate and configured to correspond to a second portion of an outer circumferential surface of the tire; and
      a plurality of upper projections extending from the upper face plate and configured to correspond to cavities in the second side of the tire, wherein the upper projections taper as the upper projections extend from the upper face plate, and wherein at least some of the upper projections are hollow, wherein at least some of the lower and upper projections are aligned with one another; and
   one or more spacers between the at least some lower and upper projections, such that at least some of the cavities formed in the first and second sides of the tire extend from the first side of the tire to the second side of the tire in an uninterrupted manner,
   wherein the lower mold portion and the upper mold portion are configured to be coupled to one another, such that a hub associated with the tire provides a seal between the lower mold portion and the upper mold portion.

2. The system of claim 1, wherein at least one of the lower relief and the upper relief is configured such that a cross-section of the tire formed by the first and second sides increases with a radius of the tire.

3. The system of claim 2, wherein the lower relief and the upper relief are configured such that the cross-section of the tire formed by the first and second sides has a substantially trapezoidal shape.

4. The system of claim 1, wherein the one or more spacers include silicone.

5. The system of claim 1, wherein cross-sections of at least some of the lower and upper projections include both a parallelogram shape and one of a circular and elliptical shape.

6. The system of claim 1, wherein at least some of the lower and upper projections are arranged in concentric circles in the respective lower and upper mold portions.

7. The system of claim 6, wherein lower and upper projections associated with different concentric circles have different cross-sections at at least one point along the lengths of the lower and upper projections.

8. The system of claim 1, wherein the lower and upper face plates have apertures corresponding to at least some of the lower and upper projections, and wherein the apertures provide flow communication between hollow portions of the at least some lower and upper projections and exterior to the lower and upper mold portions.

9. The system of claim 1, further including a plurality of lugs coupled to the lower and upper circular barriers and configured to provide a tread relief corresponding to a tread of the tire.

10. The system of claim 1, wherein the lower and upper face plates each include a seal configured to provide a seal between the hub associated with the tire and the lower face plate and between the hub and the upper face plate.

11. The system of claim 1, further including a hub confined between the lower and upper mold portions, such that the hub provides the seal between the lower mold portion and the upper mold portion.

12. The system of claim 1, further including at least one temperature sensor associated with the lower and upper mold portions, the at least one temperature sensor being configured to provide signals indicative of the temperature of material received in the lower and upper mold portions during at least one of forming the tire and use of the formed tire.

13. The system of claim 1, further including a lift apparatus configured to lower the upper mold portion onto the lower mold portion, lift the upper mold portion from the lower mold portion, and re-orient the upper mold portion.

14. A system for molding a non-pneumatic tire, the system comprising:
   a lower mold portion including:
      a lower face plate configured to provide a lower relief corresponding to a first side of the tire;
      a lower circular barrier coupled to the lower face plate and configured to correspond to a first portion of an outer circumferential surface of the tire; and
      a plurality of lower projections extending from the lower face plate and configured to correspond to cavities in the first side of the tire; and
   an upper mold portion configured to be coupled to the lower mold portion, the upper mold portion including:
      an upper face plate configured to provide an upper relief corresponding to a second side of the tire;
      an upper circular barrier coupled to the upper face plate and configured to correspond to a second portion of an outer circumferential surface of the tire; and
      a plurality of upper projections extending from the upper face plate and configured to correspond to cavities in the second side of the tire, wherein at least some of the lower and upper projections are aligned with one another; and
   one or more spacers between the at least some lower and upper projections, such that at least some of the cavities formed in the first and second sides of the tire extend from the first side of the tire to the second side of the tire in an uninterrupted manner,
   wherein the lower mold portion and the upper mold portion are configured to be coupled to one another, such that a hub associated with the tire provides a seal between the lower mold portion and the upper mold portion.

15. The system of claim 14, wherein the lower and upper face plates each include a seal configured to provide a seal between the hub associated with the tire and the lower face plate and between the hub and the upper face plate.

16. The system of claim 14, further including a hub confined between the lower and upper mold portions, such that the hub provides the seal between the lower mold portion and the upper mold portion.

17. A system for molding a non-pneumatic tire, the system comprising:
   a lower mold portion including:
      a lower face plate configured to provide a lower relief corresponding to a first side of the tire;
      a lower circular barrier coupled to the lower face plate and configured to correspond to a first portion of an outer circumferential surface of the tire; and
      a plurality of lower projections extending from the lower face plate and configured to correspond to cavities in the first side of the tire;
   an upper mold portion configured to be coupled to the lower mold portion, the upper mold portion including:
      an upper face plate configured to provide an upper relief corresponding to a second side of the tire;
      an upper circular barrier coupled to the upper face plate and configured to correspond to a second portion of an outer circumferential surface of the tire; and
      a plurality of upper projections extending from the upper face plate and configured to correspond to cavities in the second side of the tire wherein at least some of the lower and upper projections are aligned with one another;
   one or more spacers between the at least some lower and upper projections, such that at least some of the cavities formed in the first and second sides of the tire extend from the first side of the tire to the second side of the tire in an uninterrupted manner; and
   at least one temperature sensor associated with the lower and upper mold portions, the at least one temperature sensor being configured to provide signals indicative of the temperature of material received in the lower and upper mold portions during at least one of forming the tire and use of the formed tire.

18. The system of claim 17, wherein the at least one temperature sensor includes a plurality of temperature sensors each associated with different radial positions of the lower and upper mold portions.

* * * * *